United States Patent [19]

Taylor

[11] Patent Number: 4,799,185

[45] Date of Patent: Jan. 17, 1989

[54] PROTECTIVE CIRCUIT FOR MEMORY DEVICES

[75] Inventor: Lawrence D. Taylor, Lansdale, Pa.

[73] Assignee: Brandt, Inc., Bensalem, Pa.

[21] Appl. No.: 844,888

[22] Filed: Mar. 27, 1986

Related U.S. Application Data

[62] Division of Ser. No. 699,055, Feb. 7, 1985.

[51] Int. Cl.[4] .......... G06F 12/16

[52] U.S. Cl. .......... 364/900; 307/66; 365/229

[58] Field of Search .......... 365/229, 228, 226; 364/200 MS File, 900 MS File; 307/66, 64, 65, 18, 22, 23, 81; 371/66

[56] References Cited

U.S. PATENT DOCUMENTS

| | | | |
|---|---|---|---|
| 4,096,560 | 6/1978 | Footh | 364/200 |
| 4,122,359 | 10/1978 | Breikss | 307/66 X |
| 4,130,899 | 12/1978 | Bowman et al. | 365/222 X |
| 4,234,920 | 11/1980 | Van Ness et al. | 364/200 |
| 4,290,116 | 10/1981 | Morse | 364/900 |
| 4,327,298 | 4/1982 | Burgin | 364/900 |
| 4,366,481 | 12/1982 | Main et al. | 340/825.54 |
| 4,375,663 | 3/1983 | Arcara et al. | 364/200 |
| 4,451,742 | 5/1984 | Aswell | 307/66 X |
| 4,492,876 | 1/1985 | Colbert et al. | 307/66 X |
| 4,531,214 | 7/1985 | Torres et al. | 371/66 X |
| 4,563,628 | 1/1986 | Tietz et al. | 320/20 X |

*Primary Examiner*—Gareth D. Shaw
*Assistant Examiner*—Paul Kulik
*Attorney, Agent, or Firm*—Shenier & O'Connor

[57] ABSTRACT

A circuit for protecting the contents of memory devices, each having a power supply voltage input terminal and a disabling signal input terminal following a failure in an A.C.-derived D.C. potential in which respective time delay circuits couple battery potential to said power supply voltage terminals and to said disabling signal input terminals at respective predetermined times after said failure.

15 Claims, 15 Drawing Sheets

PROTECTIVE CIRCUIT FOR MEMORY DEVICES

This is a division of application Ser. No. 699,055, filed Feb. 7, 1985.

FIELD OF THE INVENTION

The present invention relates to paper currency dispensers and more particularly to a novel microprocessor-based controller for paper currency dispensers and the like for dispensing currency accurately and at high speeds.

BACKGROUND OF THE INVENTION

Some of the important applications for currency dispensing include the preparation of a cash payroll for employees; cashing checks at banks or check cashing agencies; and dispensing currency in retail establishments, the amount of said currency being the difference between the currency tendered for payment by the customer and the cost of the item. Typically these dispensing operations are performed manually. It is desirable to provide apparatus capable of accurately dispensing paper currency at high speed and to provide such apparatus at a cost which is not prohibitive to make such apparatus desirable to a wide range of potential users.

BRIEF DESCRIPTION OF THE INVENTION

The present invention is characterized by comprising solid state controller means for controlling a novel dispenser described in detail in copending application Ser. No. 699,044 filed on Feb. 7, 1985, now U.S. Pat. No. 4,660,822, by the assignee of the present application. The dispenser apparatus described therein comprises a plurality of individual dispensing devices each adapted to dispense one particular denomination of paper currency. The individual dispensing devices are arranged in tandem fashion and each selectively dispenses a predetermined quantity of paper currency to a predetermined position along a common acceleration device which accelerates and advances paper currency received by the acceleration device to an output stacker.

Each individual dispensing device includes a feed roller rotatable under control of a drive motor which is preferably a stepper motor. A sensor for each individual dispensing device is positioned adjacent the common acceleration device and serves the dual function of determining that the operation and its associated feed roller has resulted in the delivery of a paper bill to the acceleration device and further to determine the density of each bill to detect for the presence of double fed or overlapping bills.

The sensor for the individual dispensing device closest to the output stacker serves the additional function of assuring that each bill delivered from those individual dispensing devices located upstream relative to the last mentioned sensor have in fact delivered bills to the last mentioned sensor thereby assuring that all of the bills have been delivered to the output stacker.

A sensor is provided in the output stacker to be assured that the output stacker is empty before initiating any new dispensing operation to prevent bills from an earlier dispensing operation from being commingled with bills from a later dispensing operation. Further sensors are also provided for detecting that the paper currency in each individual dispensing device is either low or empty, enabling the apparatus to select an alternative dispensing routine wherein the remaining denominations are utilized to dispense the desired sum.

The sensors utilized to assure the feeding of bills to the acceleration device further serve the additional function of determining the density of the bills, employing an adaptive technique which develops a continuously updated average density which is utilized to detect the presence of multiple-fed or overlapping sheets.

A stepper motor control circuit selectively operates each stepper motor in a simplified manner and employs only one control circuit and a transistor selection circuit for each stepper motor for selecting the desired stepper motor.

The system operating voltage for the controller is continuously monitored and, depending upon the nature of the power loss, automatically couples the memory devices to emergency power supplies, such as batteries to avoid the loss of data. The monitoring circuit provides the correct control sequence to protect the contents of memory during both a power up and a power down mode.

OBJECTS OF THE INVENTION AND BRIEF DESCRIPTION OF THE FIGURES

It is therefore one object of the invention to provide a novel controller for operating a dispensing device for dispensing paper currency accurately and at high speed.

Still another object of the present invention is to provide a novel controller for operating a dispensing device and utilizing an adaptive density technique.

Still another object of the present invention is to provide novel multiplexed control circuitry for the drive motors of a dispensing device to reduce the cost and complexity of the control circuitry.

Still another object of the present invention is to provide control apparatus for a dispensing device for dispensing paper currency and the like in which currency may be dispensed in any one of three different alternative techniques selectable by the operator.

Still another object of the present invention is to provide apparatus for monitoring the controller power source for dispensing device and for automatically coupling auxiliary power to the controller memories upon power loss or brown out.

Still another object of the present invention is to provide a novel gain adjustment technique for the sensors utilized in currency dispensing apparatus to adaptively adjust the output of the sensors.

The above as well as other objects of the present invention will become apparent when reading the accompanying description and drawing, in which.

Figure 2:
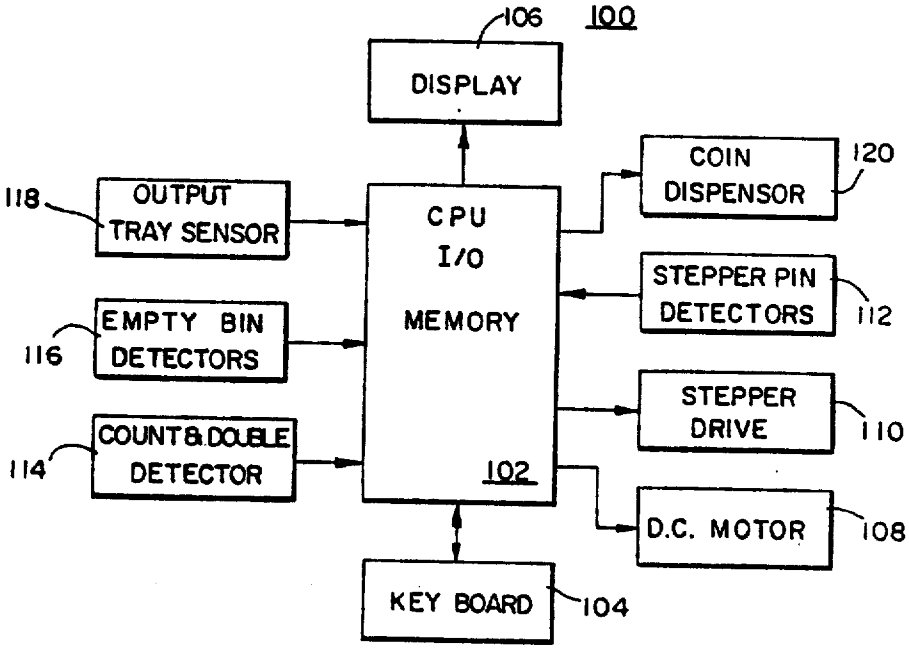
FIG. 2 is a block diagram of an electronic control system of the device of FIG. 1.
Figure 2A:
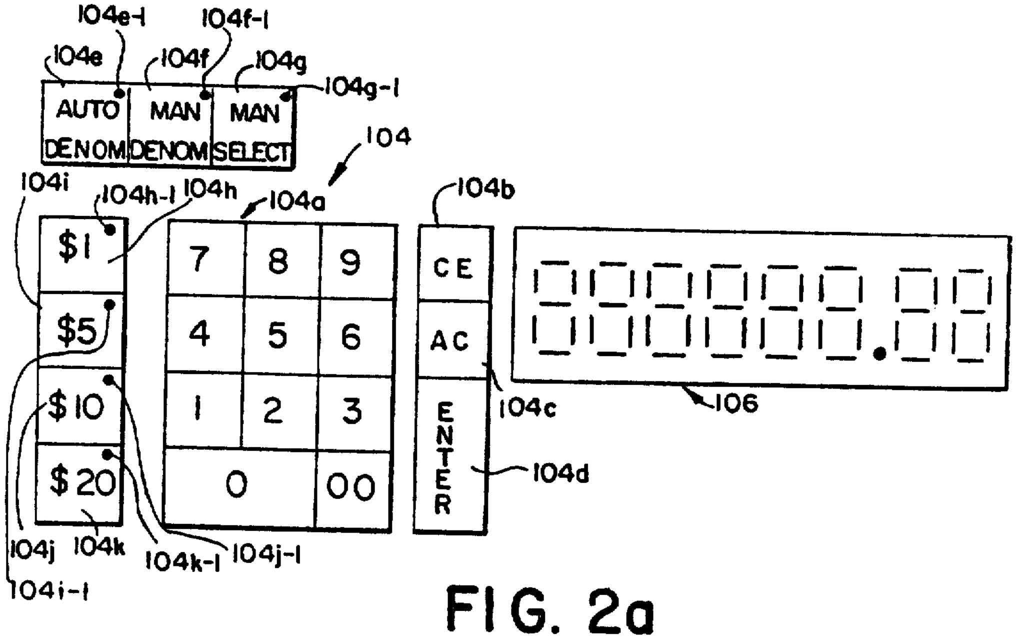
Figure 3:
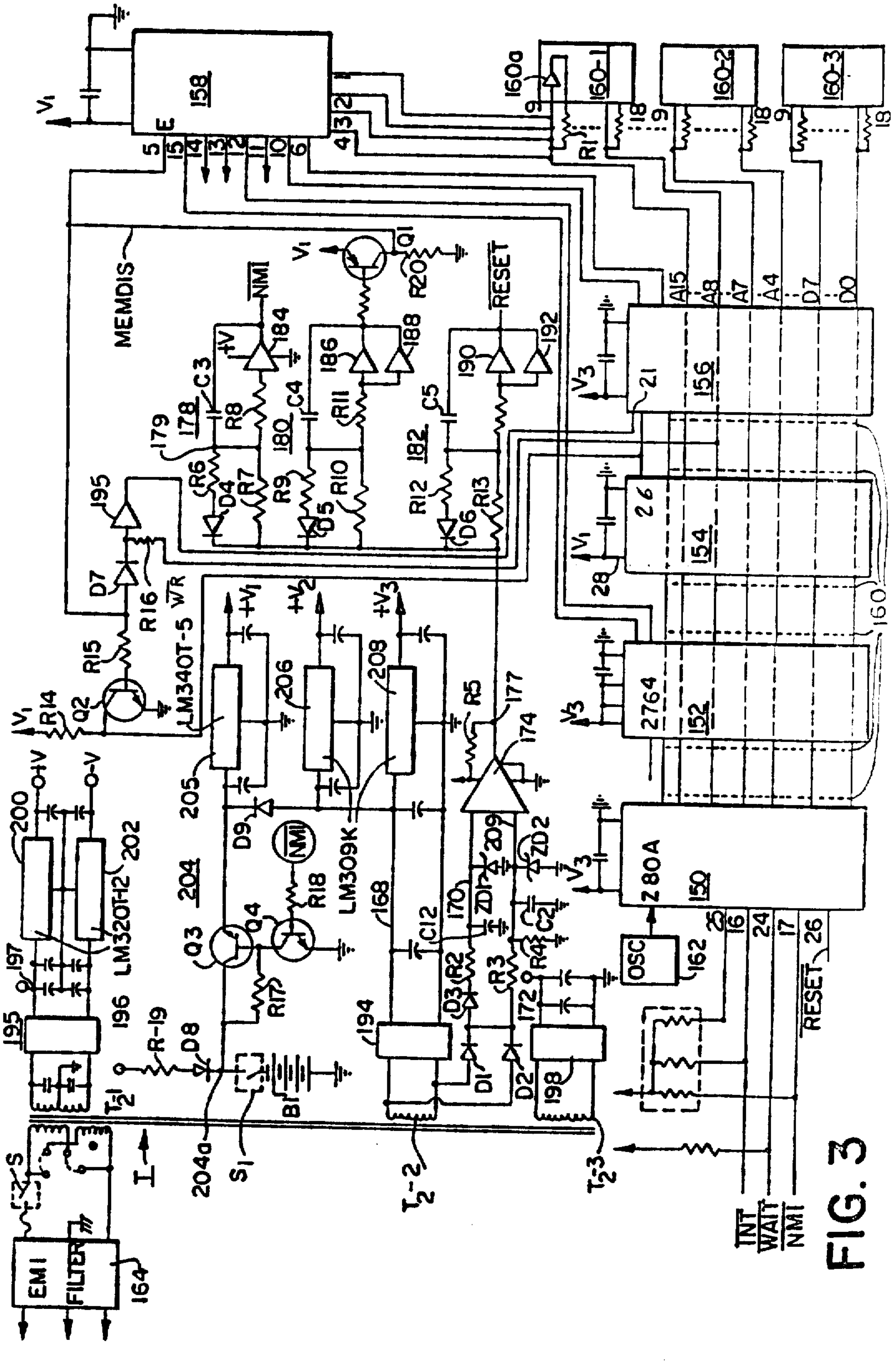
Figure 4A:
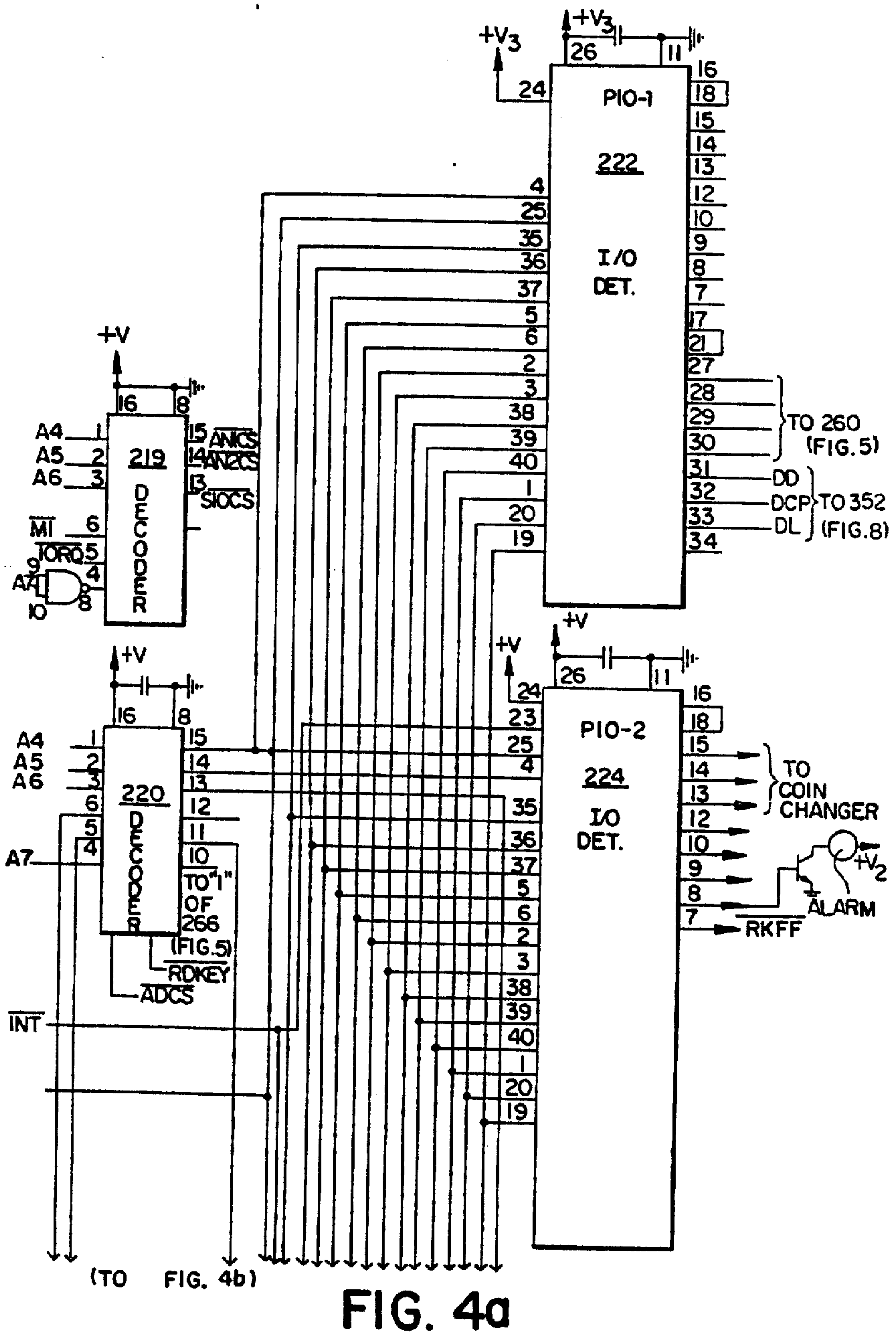
Figure 4B:
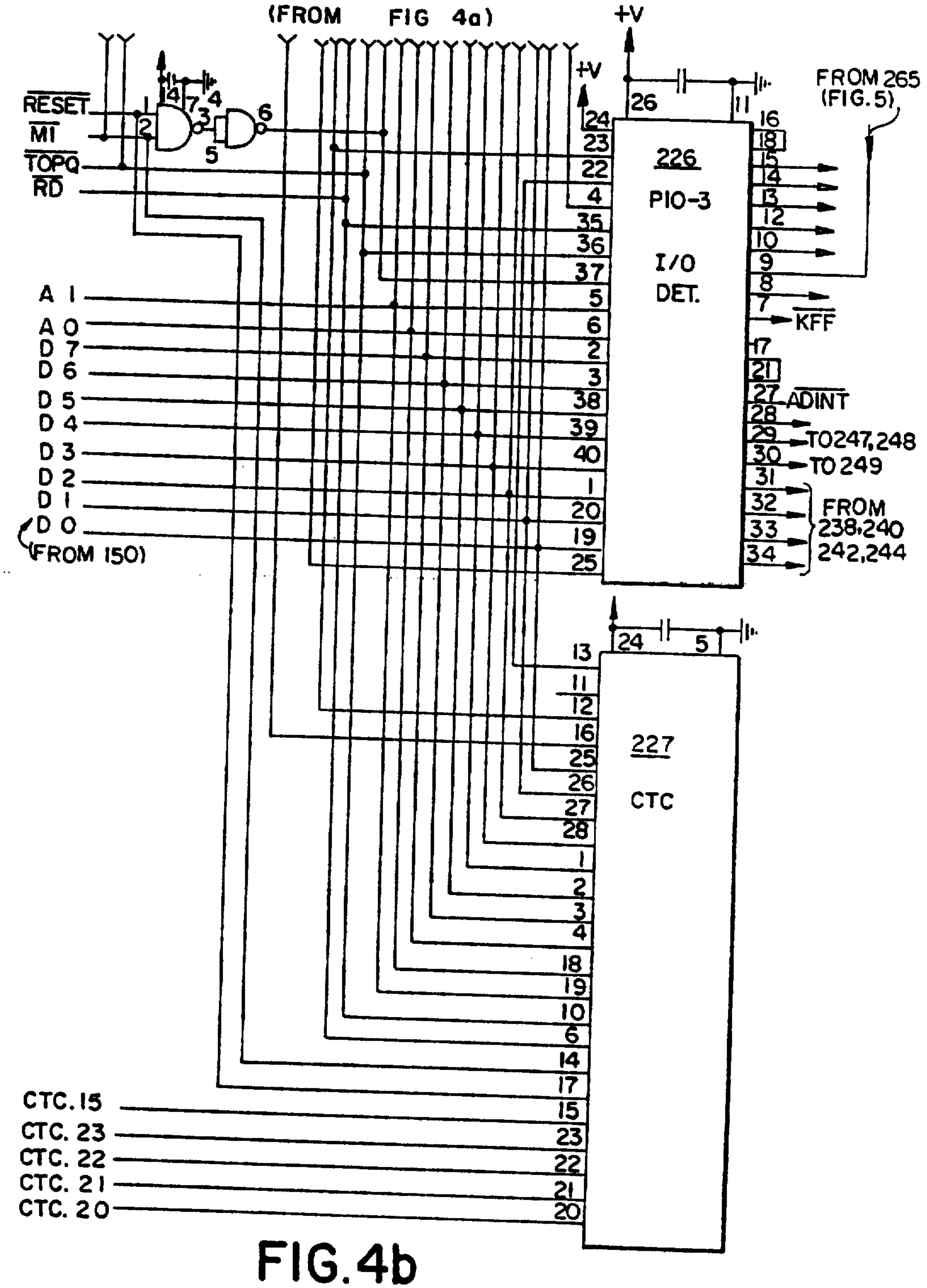
Figure 5:
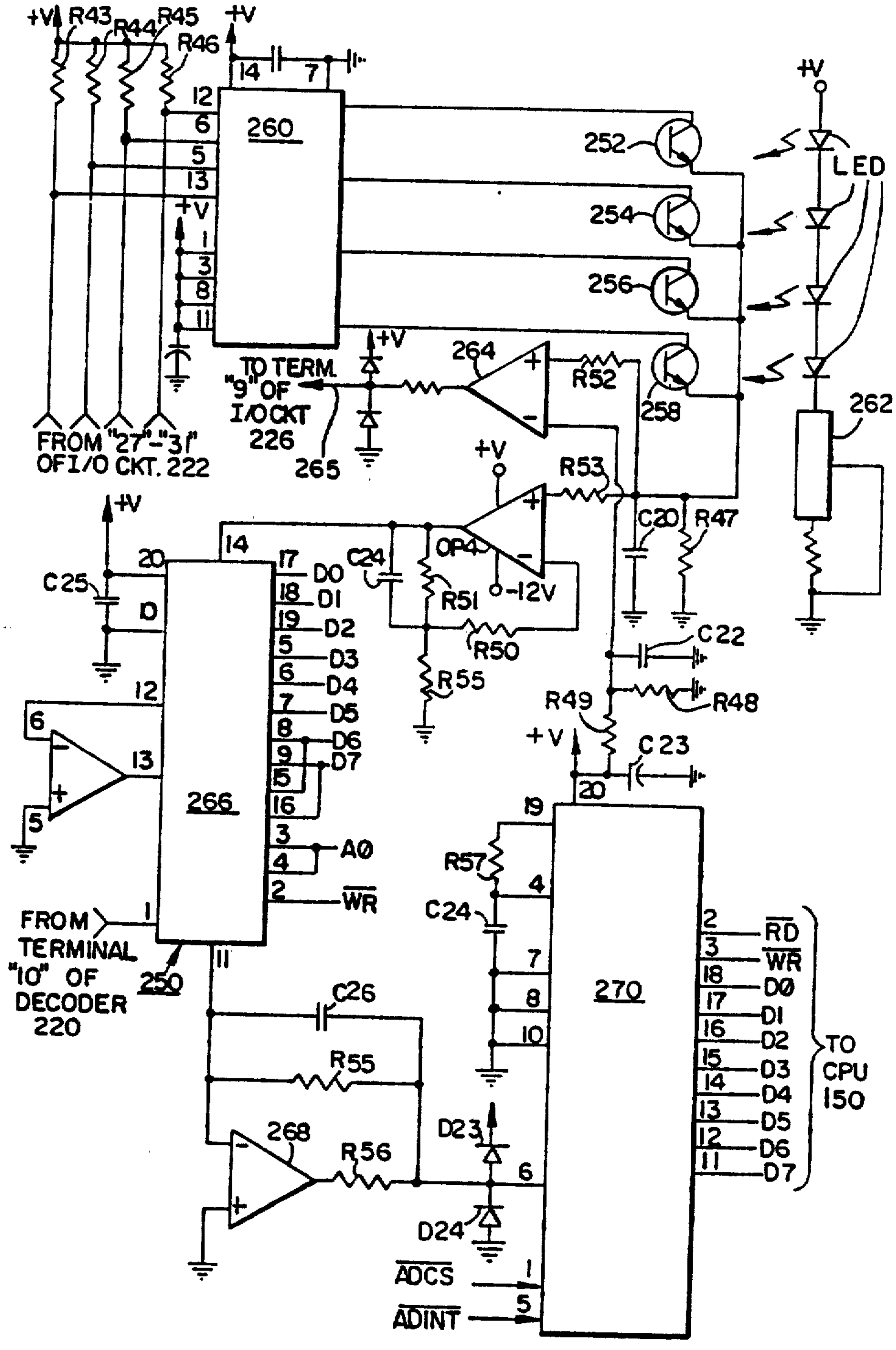
Figure 6:
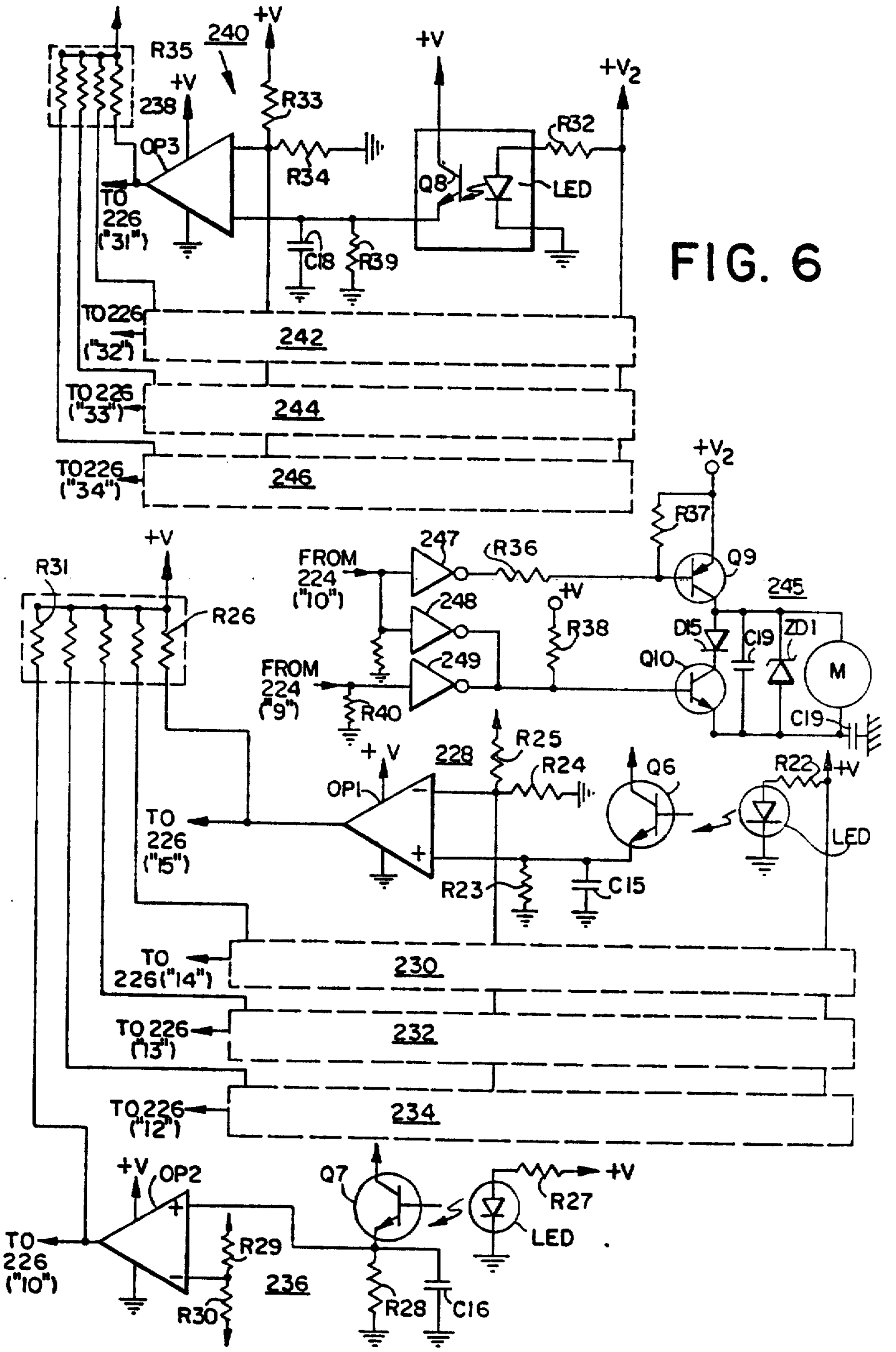
Figure 7:
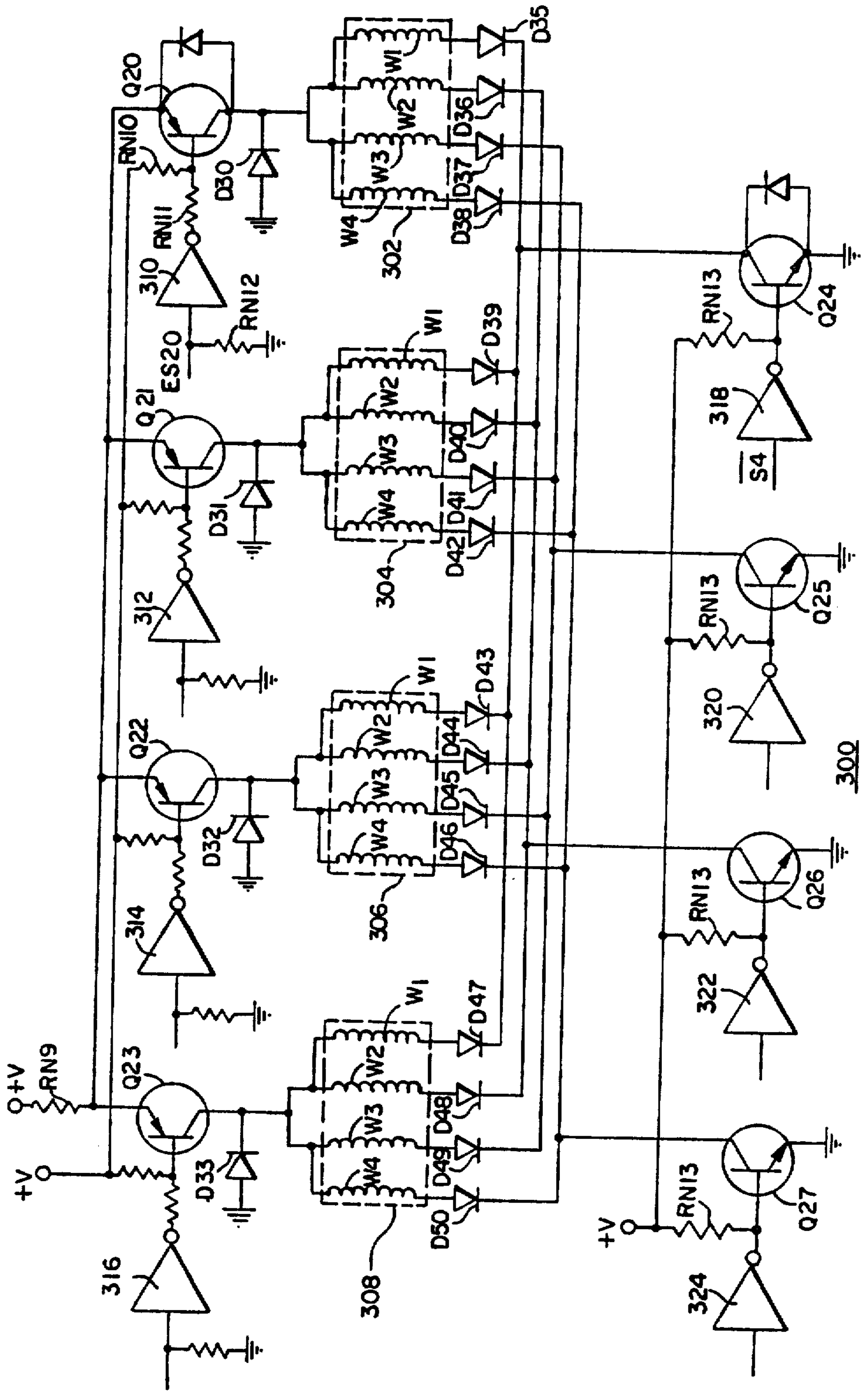
Figure 8:
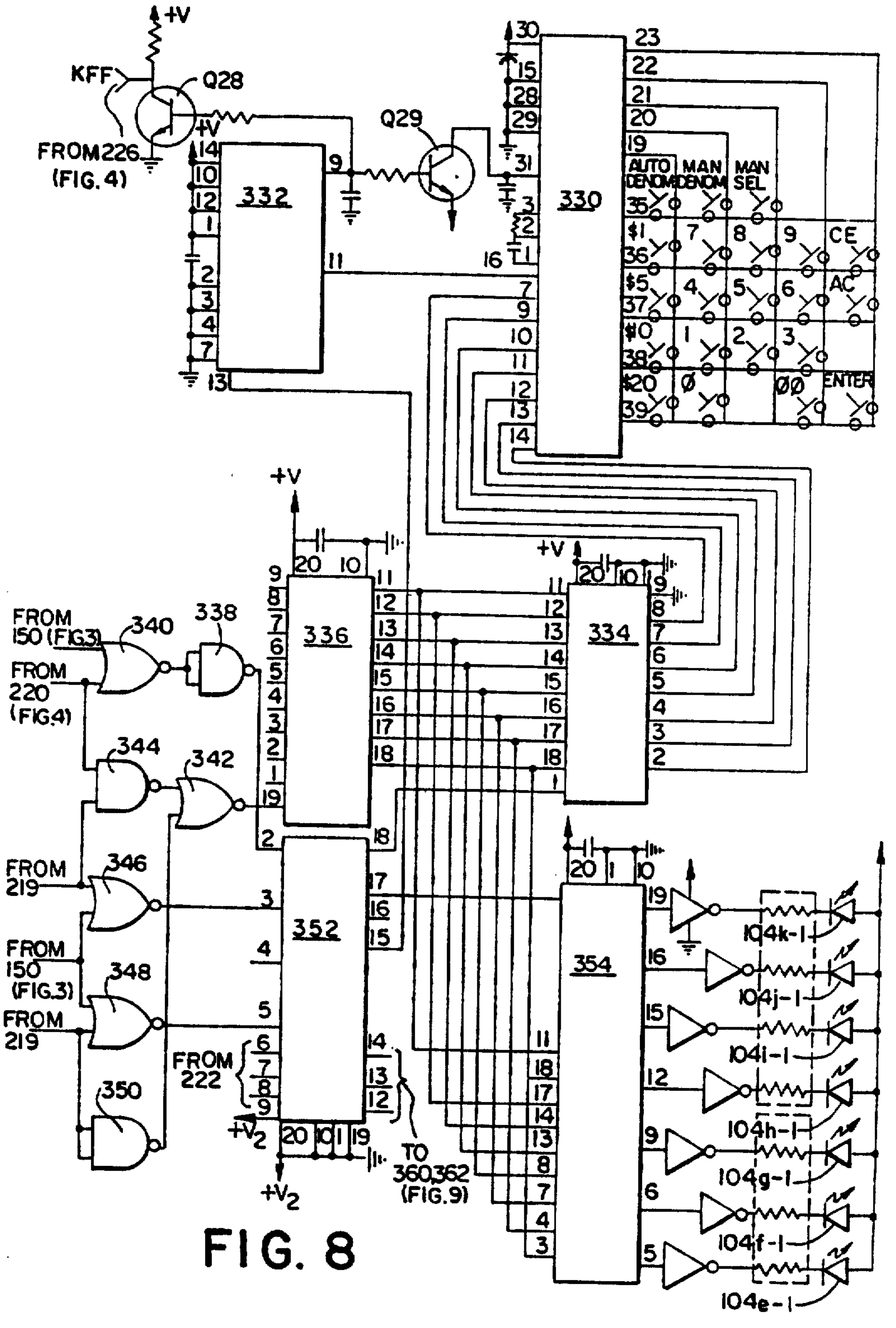

FIG. 2*a* shows the display panel for the control system of FIG. 2;

FIG. 3 is a schematic of the CPU, power up and power down circuits of the control system;

FIGS. 4*a* and 4*b*, taken together, show I/O circuits and decoders controlled by the CPU;

FIG. 5 is a schematic diagram of a density circuit;

FIG. 6 is a schematic diagram of the sensor circuits and motor control circuits controlled by the CPU;

FIG. 7 is a schematic diagram of a stepper motor control circuit operated by the CPU;

FIG. 8 is a diagram of the keyboard of FIG. 2*a;*

Figure 9:
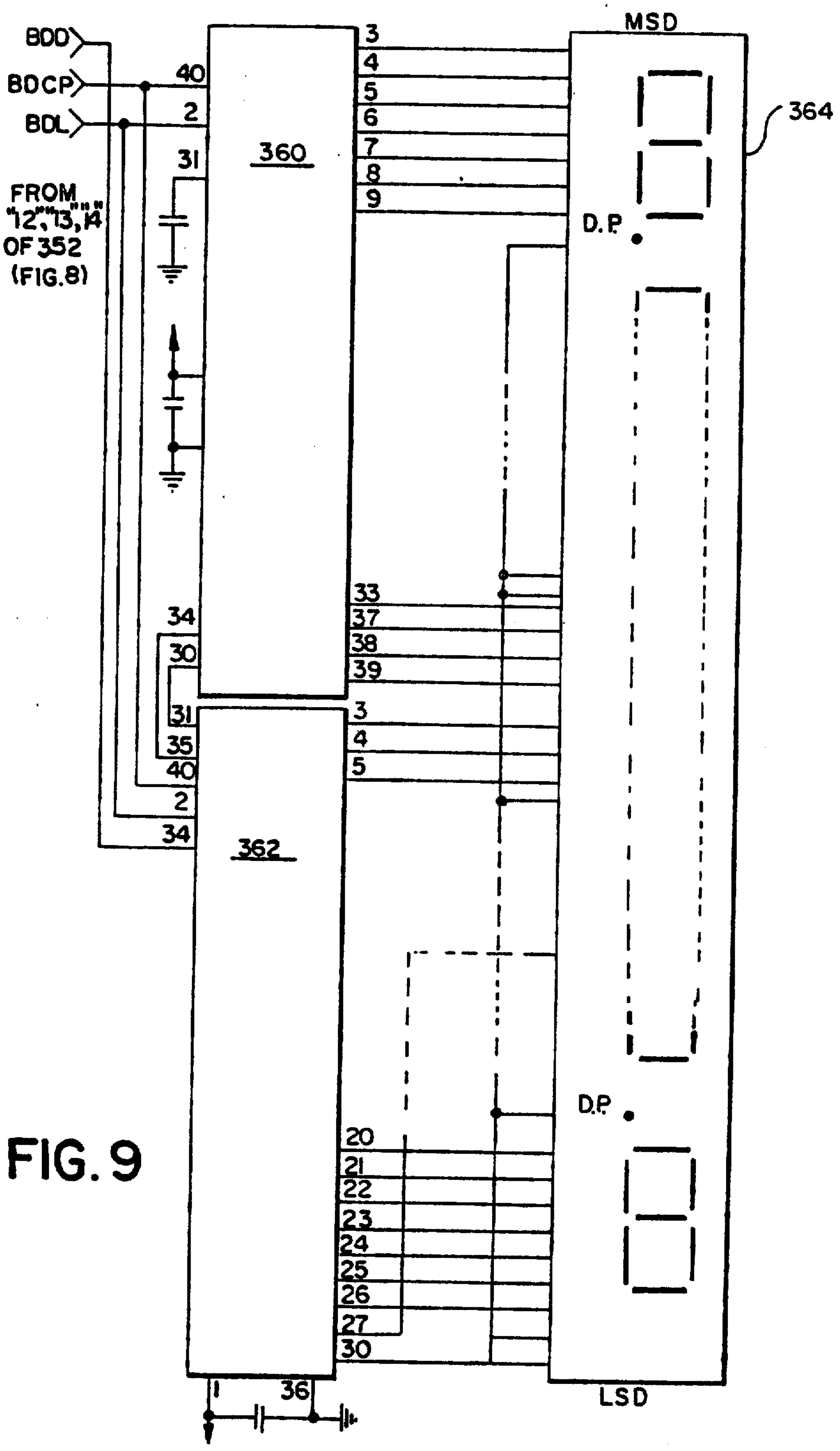

FIG. 9 is a diagram of the display of FIG. 2*a;*

FIGS. 10–15*b* are flow diagrams showing the operation of the electronic control system.

DETAILED DESCRIPTION OF THE INVENTION AND PREFERRED EMBODIMENTS THEREOF

The present invention is directed to electronic solid state control means for dispensing apparatus. The dispensing apparatus is disclosed in detail in co-pending application (Brandt 3.0–0.32), Ser. No. 699,044, filed Feb. 7, 1985 now U.S. Pat. No. 4,660,822, by the assignee of the present invention and a detailed description will therefore be omitted, the disclosure therein being incorporated herein by reference thereto. For purposes of understanding the present invention, a brief description of the dispenser, as shown in FIG. 1 of the present application, which substantially corresponds to FIG. 1*b* of the above-mentioned co-pending application, is set forth below.

Figure 1:
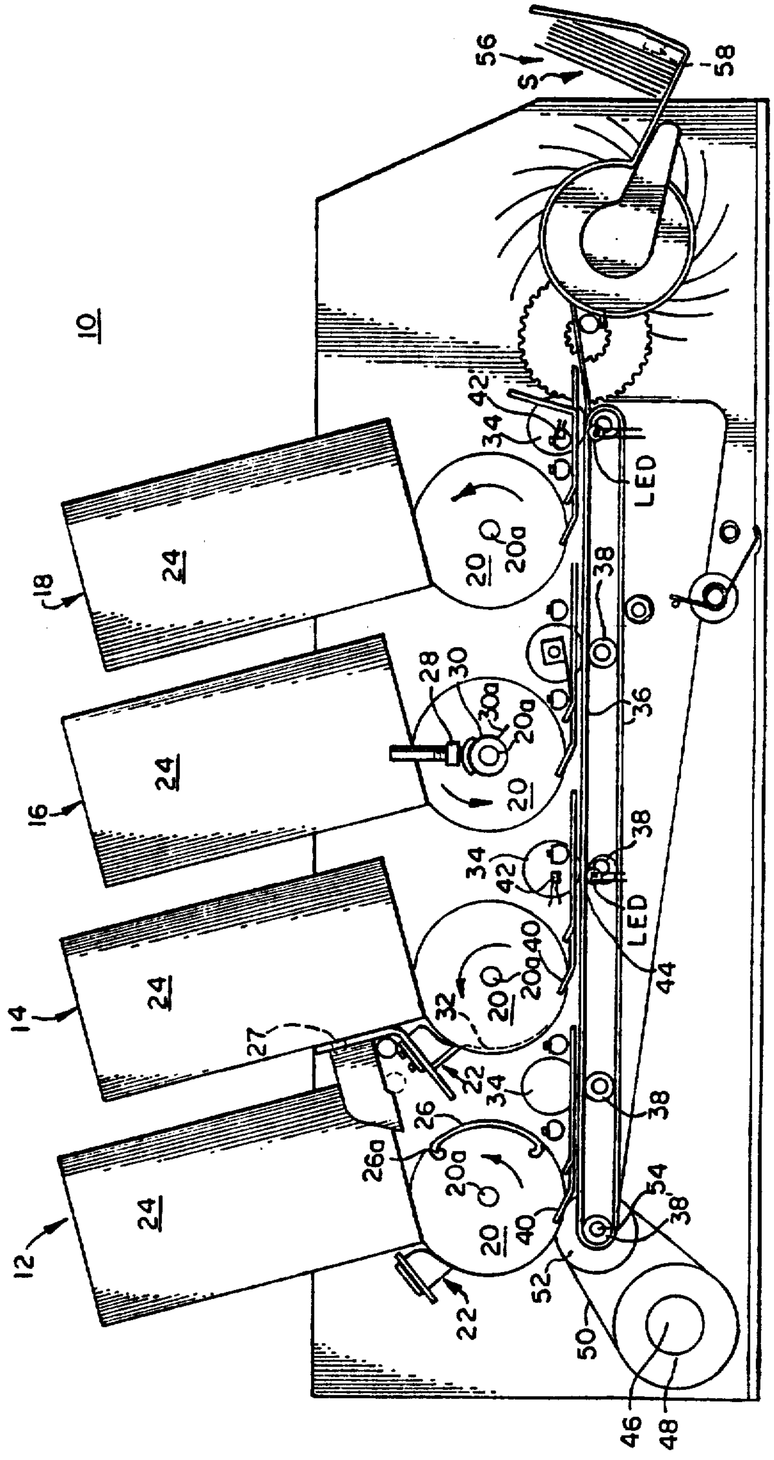
FIG. 1 is a side view of a dispensing device (mechanical)

As shown in FIG. 1 herein, dispenser apparatus 10 comprises individual dispensing devices 12, 14, 16 and 18 each comprised of a feed roller 20 cooperating with stripper shoe 22 for feeding the bottom sheet of a stack of sheets arranged within each currency cassette 24. Some of the elements of each individual dispensing device have been omitted from FIG. 1 for purposes of simplicity, it being understood that all of the dispensing devices are substantially identical in both design and function.

When a low or empty cassette condition occurs, this is detected by a sensor 27 provided for examining the contents of each cassette.

Each feed roller 20 is mounted upon a drive shaft 20*a* for drive by a stepper motor (not shown for purposes of simplicity) which is driven substantially through one full revolution to dispense a bill from its associated cassette. Each cassette preferably contains paper currency of a different denomination. For example the cassettes of individual dispensing devices 12, 14, 16 and 18 respectively contain paper currency in denominations of $20.00, $10.00, $5.00, and $1.00 respectively. The unique nature of each feed roller requires that each feed roller be oriented in a particular angular position prior to each dispensing operation in order to assure that leading edge 26*a* of a high friction insert 26 provided on each roller reaches dispensing speed before it engages the bottom sheet in its associated cassette 24.

After completion of one revolution, it is important that the feed roller be halted at the aforementioned angular position preparatory to the next dispensing operation, necessitating proper control over the stepper motor for each feed roller and further including home position detecting means 28 for each dispensing device 12–18 which detection means detects the presence of a home position pin 30*a* extending outwardly from a coupler 30 employed to couple the output shaft of the stepper motor (not shown) with the feed roller shaft 20*a*.

The rotation of a feed roller 20 from its home position through one revolution causes its insert 26 to drive the bottom sheet in its associated cassette 24 out of the cassette and between the surface of insert 26 and a cooperating stripper shoe 22. The feed roller insert 26 and stripper shoe 22 cooperate in a manner described in detail in the aforementioned co-pending application to assure that only single sheets are fed past the stripper shoe 22.

A curved guide spring 32 guides the paper bill about the associated feed roller 20 and beneath a guide plate 40 positioned above an elongated closed loop acceleration belt 36 supported at spaced intervals by rollers 38. Each guide plate 40 resiliently mounts an idler roller 34 positioned above an associated roller 38 to form an acceleration nip for accelerating sheets whose leading edge enters the acceleration nip as it leaves the influence of its associated feed roller. To be assured that the rotation of a feed roller results in the feeding of a bill into an acceleration nip, there is provided a sensor 42 mounted upon plate 40 and a cooperating light source such as an LED mounted beneath the plate 44 supporting acceleration belt 36. The LED and cooperating sensor 42 are preferably arranged in close proximity to the acceleration nip of their associated individual dispensing devices. The sensors 42 are examined a predetermined interval after initiation of rotation of their associated feed rollers to assure delivery of a bill to an acceleration nip. The idlers 34 are driven by acceleration belt 36 which, in turn, is rotated by DC motor 46 for imparting rotation to belt 36 through a pulley 48 mounted upon the output shaft of motor 46 and a pulley 52 mounted upon shaft 54 which supports the left-handmost roller 38', said O-ring 50 being entrained about pulleys 48 and 52. Drive energy is imparted to DC motor 46 through the controller to be described hereinbelow.

The right-hand most sensor 42' serves the three functions of density evaluation, determining if a bill has been fed from its associated cassette 24 and further determining if bills from individual dispensing devices 12 through 16 have been delivered by acceleration belt 36 to the final acceleration nip for delivery to output stacker 56. The controller examines sensor 42' at the appropriate time to assure such bill delivery.

Output stacker 56 stacks sheets S in the manner shown and is provided with a sensor 58 for determining if the output stacker is empty, which condition is utilized in a manner to be more fully described to prevent a subsequent dispensing operation until the output stacker has been cleared of paper currency delivered thereto as a result of the previous dispensing operation.

Sensors 42 and 42' and the cooperating LEDs, in addition to detecting the feeding of single sheets, and thereby serving a counting function, are also utilized to measure the density of sheets. The intensity of light reaching each sensor 42 is a function of the density or transmissivity of each sheet passing between the sensor 42 and the LED. Thus, in the event that overlapping double fed or multiple fed sheets are moved through any of the aforementioned acceleration nips, the density values, which are directly related to the output signal developed by the dispensing devices 42 and 42', are utilized to detect the presence of overlapping or multiple fed sheets in order to stop the dispensing operation and alert the operator to the potentially incorrect count.

The controller of the present invention provides all of the drive signals and the monitoring of all of the aforementioned motors and sensors to assure proper as well as high speed, accurate operation of the dispensing apparatus.

FIG. 2 is a simplified block diagram of the system control for the dispensing apparatus 10 shown in FIG. 1, said system 100 being comprised of CPU 102 which further includes input/output (I/O) interfaces and memory including both read only memory and random access memory devices. Data is inputted to this CPU through keyboard 104 forming a part of the dispenser control panel together with display means as will be described in connection with FIG. 2a. The display 106 displays the total to be dispensed and certain error indications, as will be more fully described.

DC motor drive circuit 108 operates the DC motor 46 shown in FIG. 1 for controlling the acceleration of paper bills. The stepper motor drive circuit 110 is coupled to each of the individual stepper motors which drive their associated feed rollers.

The home position detectors 28 are coupled to the CPU through detector circuitry 112.

The sensors 42 and 42' are coupled to the CPU through the count and double detector circuitry 114 providing information regarding the count and the density of bills delivered to the output stacker from each individual dispensing device.

The sensor 42' is further examined by the CPU to be assured that bills delivered from dispensing devices 12, 14 and 16 have reached the acceleration nip associated with sensor 42' to be assured that these bills reach the output stacker.

Circuit 118 couples the output tray sensor 58 and circuit 116 couples the empty bin detectors 27 to the CPU.

The CPU may further be utilized to operate a coin dispensing apparatus (not shown for purposes of simplicity) through drive circuitry 120.

The control panel shown in FIG. 2a includes display 106 and keyboard 104.

Display 106 is comprised of a digital type segmented display of seven digit positions. The segmented digit positions may further be utilized to create several alphabetic characters to provide certain word displays, as will be more fully described.

Keyboard 104 is comprised of a group of numeric keys 104a, a clear entry key 104b, an all clear key 104c, enter key 104d, auto denomination key 104e, manual denomination key 104f, manual select key 104g and the individual denomination keys 104h, 104i, 104j and 104k for the $1.00, $5.00, $10.00 and $20.00 denominations, respectively. Each of the keys 104e through 104k is provided with an LED 104e-l through 104k-l which is normally not lit. When a key has been selected, its LED is on. At least one of the keys 104e, 104f, and 104g will have its LED lit at any given time. Likewise at least one of the four keys 104h through 104k will have its LED lit at any given time.

The selection of the automatic denomination key followed by entry of the amount of currency to be dispensed followed by operation of the enter key causes the CPU to dispense the smallest number of bills which total the desired amount.

The selection of the manual denomination key together with the deselection of one or more of the keys 104h through 104k and entry of the desired amount to be dispensed cause the CPU to dispense those bills which will amount to the total to be dispensed but which is comprised of only bills of those denominations whose keys 104h through 104k have their LEDs lit. For example, to dispense $56.00 in the auto denomination mode, the dispenser will dispense two twenty-dollar bills; one ten-dollar bill; one five-dollar bill; and one one-dollar bill. Using the manual denomination mode, and assuming that the total to be dispensed is not to include any twenty-dollar bills, the CPU will select the smallest number of bills to make up the amount to be dispensed but omitting the use of twenty-dollar bills. In this case the CPU will dispense five ten-dollar bills; one five-dollar bill; and one one-dollar bill.

By selecting the manual select key 104g, the number of bills to be dispensed is entered by operating each denomination key, the appropriate number key (or keys) and then entering this amount. Assuming the operator wishes to dispense $56.00 in the form of five ten-dollar bills and six one-dollar bills, the bill denominations, numeric keys and enter key are operated to select the amount of bills of each denomination to be dispensed. The amount is displayed providing the operator with the opportunity to observe the display to be assured that the amount is correct.

FIG. 3 shows a portion of the control system 100 of FIG. 2 in greater detail and more specifically shows the CPU 150 forming part of the circuit portion 102. In the preferred embodiment CPU 150 comprises a Z80A, although any other type of microprocessor having the equivalent characteristics may be employed. The model numbers of all circuits (i.e. "chips") employed in the controller are set forth below. Microprocessor 150 is coupled to a plurality of memory devices including an EPROM 152 which may for example be a model 2764; a RAM 154 which may for example be a model UPD4364C and an $E^2$PROM 156. Main memory 152 is preferably an 8K memory, RAM 154 is preferably an 8K memory and memory 156 is preferably a 2K by 8 memory. Each of these memories are coupled to CPU 150 by the lines 160. Memory selection is made by CPU 150 which applies a 3 bit binary code on lines A13 through A15 to a one-of-eight decoder 158 which may, for example, be a model 74HCT138 having output lines for selectively enabling one of the group of memories 152 through 156. The additional output lines of decoder 158 may be utilized to enable additional memories which may be added to the system to provide further capabilities. Enable line E of decoder 158 is derived from the power monitoring circuitry to be described.

All of the lines coupled between CPU 150 and the memories 152–156 are terminated by means of circuits 160-1 through 160-3 which are preferably model 74HCT541 circuits each of which circuits comprise a plurality of non-inverting buffers such as for example the buffer 160a whose output is coupled to its input through a resistor R1 which, in the preferred embodiment is preferably a 1K ohm resistor. The active terminators 160-1 through 160-3 control the DC level at the common terminal between the output of amplifier 160a and resistor R1. The output of amplifier 160a is maintained at either 0 volts or +5 volts. During an increasing voltage, as soon as the input to amplifier 160a reaches 2 volts DC, the output switches to +5 volts DC. When the input voltage to amplifier 160a drops to a level of 0.8 volts, the output of amplifier 160a drops to 0 volts, thus providing an active line terminator which varies with the input level to the terminating load resistor R1. The remaining line terminators operate in a similar fashion.

CPU 150 functions at an operating frequency provided by oscillator 162.

The system power supply is comprised of a transformer T having its primary windings coupled to a local AC power source through a filter 164. The switch S turns the system on and off. A plurality of secondary windings are respectively incorporated into circuits 194, 195 and 198 for generating various DC levels for supplying power to the controller, as well as the other electrically driven components of the system such as the motors employed for operating the dispensing apparatus 10.

Transformer secondary winding T2—2 is coupled to a D.C. supply for the monitoring circuits including diodes D1, D2 and D3, resistors R2, R3, R4, capacitors C1 and C2, zener diodes ZD1 and ZD2 and comparator 174. Circuit 170 rectifies and filters the AC signal and provides a DC output level to three monitor circuits 178, 180 and 182. Monitor circuit 178 comprised of diode D4, resistors R6, R7 and R8, capacitor C3 and non-inverting buffer 184 develops a non-maskable interrupt signal $\overline{\text{NMI}}$ directly applied an input of the CPU 150, as shown in FIG. 3. The signal $\overline{\text{NMI}}$ is generated 0.5 to 1 milliseconds after power down to couple battery source V1 to the memory devices.

Circuit 180 having a circuit design similar to circuit 178 and providing a longer delay period generates a memory disable signal applied to transistor Q1 approximately 2 milliseconds after power down and puts the RAM memory 154 into standby mode and stops the CPU by turning off the EPROM memory 152. This accomplished in the following manner:

A battery pack B1 is selectively connected into circuit 204 by switch S1 which is ganged to the computer on/off switch S. When the computer switch S is turned on, switch S1 couples battery B1 through resistor R19 and diode D8 with output terminal 197 of the DC supply circuit 195, to charge the chargeable battery B1. The signal $\overline{\text{NMI}}$ is normally high, maintaining transistor Q4 conductive to prevent transistor Q3 from conducting and thereby decoupling the common terminal 204*a* between diode D8 and switch S1 from the input to circuit 205. Another A.C. to D.C. converter circuit 194 is coupled through diode D9 to circuit 205 to provide a 5 volts output, +V1.

The voltage of terminal 177 is normally +5 VDC. When the voltage at terminal 209 drops to +3.3 VDC, the output of buffer 174 drops to zero. When terminal 179 goes low, capacitor C3 discharges through both resistors R6 and R7. When terminal 179 drops to +1.5 VDC, the output of buffer 184 drops from +5 volts to zero volts. The zero volt level at $\overline{\text{NMI}}$ couples B1 to +V1 through switch Q3. This level is applied to the power input terminal "28" of RAM 154. $\overline{\text{NMI}}$ alerts CPU 150 to the power down situation enabling CPU 150 to save the contents of certain registers.

The memory disable circuit 180 operates in a similar manner except that the values of resistors in this circuit provide a longer time constant, preferably 2 msecs, to allow CPU 150 sufficient time to save the contents of its RAM-type registers. The signal MEMDIS disables RAM 154, $E^2$PROM 156 and memory decoder 158 by applying ground potential to terminal "26" of RAM 154, and $+V_1$ to terminal "21" of $E^2$PROM 156 through D7 and buffer 195 and enable terminal "5" of decoder 158, i.e. terminal E. The signal MEMDIS applies +V1 to $E^2$PROM 156 through inverter 190.

The $\overline{\text{RESET}}$ delay circuit 182 operates in a similar fashion except that the resistor values are selected to provide a still longer time constant such that the signal $\overline{\text{RESET}}$ goes to zero approximately 4 to 4.5 msecs after terminal 177 goes to +1.5 VDC. The signal $\overline{\text{RESET}}$ turns off CPU 150.

Summarizing, when the $\overline{\text{NMI}}$ signal goes low, transistor Q4 is turned off enabling transistor Q3 to turn on and couple the battery supply B1 to circuit 205. As was mentioned hereinabove, EPROM 152 is turned off and the RAM memory 154 is placed on standby being supplied by battery supply B1. Transistor Q2 is turned on upon turn on of transistor Q1 by circuit 180. Two milliseconds after power down, the battery is coupled through transistor Q3, and circuit 205 to input "28" of memory 154. Diode D7 couples MEMDIS to the write/read line of the $E^2$PROM 154 to prevent this line from being toggled, thereby preventing a change in the contents of these memories during power down.

Within 4 to 4.5 milliseconds, circuit 182 generates the reset signal $\overline{\text{RESET}}$ which is directly applied to CPU 150 to turn it off.

During a power up mode, the $\overline{\text{RESET}}$ signal maintains CPU 150 off for a predetermined time. The output of circuit 178 couples the battery source B1 to memory 154. During power up, since diode D4 blocks current flow, capacitor C3 charges only through resistor R7. The $\overline{\text{NMI}}$ signal generates the non-maskable interrupt which is removed a predetermined time interval after power up. The output of buffer 184 goes to +5 VDC when terminal 179 reaches +3.5 VDC. A predetermined time interval after power up the memory disable signal MEMDIS is removed, coupling the memory devices to the CPU 150. The capacitor in circuit 180 charges only through resistor R10. A predetermined time interval after power-up the $\overline{\text{RESET}}$ is removed enabling the CPU 150 to begin operation. The capacitor in circuit 182 charges up only through resistor R13. Thus the circuits 178, 180 and 182 assure proper memory protection sequence of the system during both power down and power up modes.

FIGS. 4*a* and 4*b* together show some of the intermediate circuits employed in the control system of FIG. 2 including "1 out of 8" decoders 219, 220, input/output (I/O) circuits 222, 224, 226 and CPU timing circuit 227. Decoders 219 and 220 selectively enable the microchip circuits including the input/output circuits 222, 224, 226 and the processor timing circuit 227, as well as other circuits to be more fully described. For example decoder 220 has its "1", "2", "3" and "4" input pins coupled to the A4 through A7 terminals of CPU 150 shown in FIG. 3 to generate an enabling signal at one of its outputs "7" and "9" through "15" such as for example the I/O circuit 222 whose enabling input "4" is coupled to output terminal "15" of the decoder 220.

The I/O circuits 222, 224 and 226, when selectively enabled, either transfer signals from CPU 150 to peripheral circuits or alternatively couple signals from peripheral circuits to CPU 150. For example, I/O circuit 224 has its outputs "13" through "15" to couple control signals from CPU 150 to an automatic coin changer apparatus (not shown for purposes of simplicity) for dispensing coins.

I/O circuit 226 has its "12" through "15" terminals each coupled to an output of the low level bin detector circuits provided in each of the individual dispensing devices for detecting a low level condition in an associated one of the bins which contain bills of the proper denomination. Since all four bin detecting circuits are identical, only one will be shown in detail for purposes of simplicity.

Low level bin detection circuits 230, 232 and 234 (see FIG. 6) have been shown in "black box" form it being understood that each of these circuits are substantially identical in design and function to the low level bin detection circuit 228 (see FIG. 6) which is comprised of an LED coupled between ground and a +5 volt DC source through resistor R22. The LED generates light sensed by the phototransistor Q6 having its collector coupled to the positive DC source and its emitter coupled to the non-inverting input of operational amplifier OP1. A capacitor C15 and resistor R23 are coupled in parallel between the phototransistor emitter and ground. The OP1 non-inverting input is coupled to ground through resistor R24 and is also coupled to +5 volts through resistor R25, one terminal of each of resistor R24 and R25 being coupled in common to the non-inverting input.

The OP1 output is coupled to +5 volts through resistor R26 and is further coupled to terminal "15" of I/O circuit 226. This signal is coupled to CPU 150 through I/O circuit 226. The state of the signal determines the presence or absence of a low bin condition.

The output tray detector circuit 236 is coupled to terminal "10" of I/O circuit 226 and comprises an LED having one of its terminals coupled to the DC source through resistor R27 and having its other terminal connected to ground. Phototransistor Q7 detects the light generated by the LED when the output tray has been emptied and has its collector coupled to the DC source and its emitter coupled to the non-inverting input of operational amplifier OP2. Resistor R28 and capacitor C16 are coupled in parallel between the emitter of Q7 and ground. A reference voltage is established at the OP2 non-inverting input by resistors R29 and R30 coupled between the DC source and ground and having their common terminal coupled to the non-inverting input of OP2. The OP2 output is coupled through resistor R31 to the DC source and is also coupled to terminal "10" of I/O circuit 226. The CPU examines empty tray detector circuit 236 periodically and, as was described hereinabove, prevents the initiation of a dispensing operation until the bills delivered to the output from a previous dispensing operation have been removed from the output tray.

Four home position detector circuits 240, 242, 244 and 246 (see FIG. 6) are coupled to terminals "31" through "34" of I/O circuits 226. Since these circuits are substantially identical in design and function, only circuit 240 has been shown in detail. The home position detector circuit 240 is comprised of an LED coupled to the positive DC source through resistor R32 and having its other terminal connected to ground. A phototransistor Q8 has its collector coupled to the positive DC source and has its emitter coupled to the inverting input of operational amplifier OP3. The OP3 non-inverting input is coupled in common to resistor R33 and R34 which are respectively coupled to the DC source and ground to provide a reference level. The OP3 output terminal is coupled in common to resistor R35 and to terminal 31 of I/O circuit 226. The opposite terminal of resistor R35 is coupled to the DC source. Transistor Q8 will detect light from the LED except when the pin 30*a* (FIG. 1) forming part of the home position detector circuit is blocking the light from the LED. The output level of operational amplifier OP3 is examined by CPU 150 when the operation of the associated stepper motor is halted to be assured that the stepper motor is halted so that the feed roller coupled thereto has been brought to a halt in the home position. The remaining home detection circuits 242, 244 and 246 operate in a similar manner.

The dispenser apparatus DC motor is controlled by a motor control circuit 245 whose input terminals are coupled to terminals "9" and "10" of I/O 224. Terminal "10" is coupled in common through inverters 247, 248. The output of inverter 247 is coupled to the base of transistor Q9 through resistor R36. A resistor R37 is coupled between the base and emitter of Q9. The Q9 collector is coupled through diode D15 to the collector of Q10 whose emitter is coupled to ground and whose base is coupled in common to the outputs of inverters 248 and 249. Resistor R38 is coupled between the DC source and the base of Q10. Coupled in parallel across the series circuit comprised of diode D15 and transistor Q10 are capacitor C19, zener diode ZD1 and the DC motor M. The input of inverter 249 is coupled in common to the ground through resistor R40 and to terminal "9" of I/O circuit 224. Transistor Q9 selectively couples motor M to the DC source. Transistor Q10 provides dynamic braking of motor M by developing a shunt thereacross.

Transistors Q9 and Q10 are operated such that they are never conductive at the same time. When transistor Q9 conducts to couple power to motor M, transistor Q10 is turned off. Conversely transistor Q9 is turned off and transistor Q10 is turned on to respectively remove power from motor M and to apply dynamic braking thereto.

FIG. 5 shows the circuit 250 which incorporates the count and density detection sensors employed in each of the individual dispensing devices. Circuitry 250 further includes means for automatically adjusting the output signal for each phototransistor preparatory to the sampling of the phototransistor output signal for developing an average density signal for each bill dispensed, as will be described hereinbelow.

Circuitry 250 is comprised of LEDs and associated phototransistors 252 through 258 respectively associated with each individual dispensing device. A decoder circuit 260 which has its "13", "5", "6" and "12" terminals respectively coupled to the "30" through "27" terminals of I/O detector 222 of FIG. 4*a* selectively applies a DC voltage to only one of the LEDs 252 through 258. Circuit 260 is comprised of four switches each of which, when energized, couples its associated phototransistor 252 through 258 to the DC source through one of the resistor R43 through R46. The phototransistor which is enabled is that one which is associated with the feed roller which is presently driving a bill toward the acceleration belts.

The LEDs are all connected in series between the DC source and circuit 262 for providing a predetermined constant current. The collectors of phototransistors 252 through 258 are coupled to respective outputs of circuit 260. The emitters of the phototransistors are all coupled in common to ground potential through parallel connected resistor R47 and capacitor C20. The emitters are further coupled in common to the non-inverting input of comparator 264 and the non-inverting input of operational amplifier OP4. The inverting input of comparator 264 is coupled to the common terminal between resistors R48 and R49 whose opposite terminals are respectively coupled to ground potential and the positive DC source. Resistors R48 and R49 establish a reference voltage at the inverting input of comparator 264, which is used to count bills delivered to the output stacker.

Operational amplifier OP4 has its output coupled to input "14" of digital to analog converter 266. The OP4 output is further coupled to ground potential through the parallel connected elements R51 and C21 and further including series connected resistor R55. The OP4 output is coupled to its inverting input through the parallel circuit of capacitor C21 and R51 and the series connected resistor R50.

Digital to analog converter 266 which operates as an adjustable gain amplifier, receives an enabling signal from terminal "10" of decoder 220 shown in FIG. 4*a*, and receives data input signals from terminals D1 through D7 of CPU 150 for purposes of adjusting the amplified output signal developed at terminal "11" of the digital to analog converter 266. The amplified output signal is converted to a voltage level by current to voltage converter circuit 268 whose inverting input is coupled to terminal "11" of digital to analog converter circuit 266. The output of current to voltage converter 268 is coupled to terminal "6" of an analog to digital converter circuit 270 through resistor R56. Diodes D23 and D24 which are connected in series between the DC source and ground limit the voltage swing of the signal applied to analog to input "6" of digital converter circuit 270. The digital outputs of analog to digital converter 270 are coupled to terminals D0 through D7 of CPU 150.

Circuit 250 operates in the following manner:

One of the phototransistors 252 through 258 are enabled according to the dispensing device 12, 14, 16 or 18 selected, under control of the CPU 150, the control signal being applied to circuit 260 through I/O circuit 222 shown in FIG. 4*a*. The magnitude of the current signal through the selected phototransistor, which is a function of the light impinging upon the base thereof, developes an IR drop across resistor R47, which signal is coupled to the non-inverting inputs of comparator 264 and operational amplifier OP4. The level of the signal applied to the non-inverting input of comparator 264 is compared against the reference level established at the inverting input. When the state of the comparator output signal changes, indicating that the leading edge of the bill has passed the selected phototransistor, for example phototransistor 252, the binary state of this output signal is examined at the digital outputs of analog to digital converter 270, the output signal of operational amplifier OP4 being coupled to input terminal "14" of digital to analog converter 266 which amplifies the signal in accordance with the digital valve coupled to digital inputs of the digital to analog converter 266, the amplified signal appearing at the output "11" of circuit 266 and applied to input "6" of the analog to digital converter circuit 270 through current to voltage converter 268.

In the preferred embodiment, the voltage range of the output signal at the output of 268 is between 0 and +5 volts DC. This voltage range is converted by A to D converter 270 into a digital value whose range is between 0 and 255. The programmable gain of circuit 266 is initially set to a "nominal" value which is 511, maximum being 1,023. The output of analog to digital converter 270 is examined at this time to ascertain the digital representation of the amplified output generated by circuit 266. The first analog value generated by analog to digital converter 270 is forced to 56% of the maximum reading or 144. This adjusts the gain of feedback signal of the programmable gain amplifier 266 to a nominal value which is maintained throughout the subsequent bill dispensing operations of the associated individual dispensing device. The gain is adjusted for each of the remaining phototransistors 254 through 258 in a similar manner and all of these values are stored in the RAM memory for subsequent use when a dispensing operation of their associated individual dispensing devices is required.

The gain adjustment technique described hereinabove automatically takes into account any deviation in the signal generated by each phototransistor 252 through 258 due to component aging, the collection of dust or dirt on either the LED or its associated transistor, or any other phenomena which tends to either degrade or otherwise effect the output signal developed by each phototransistor.

After the gain of the phototransistor is artificially adjusted in the manner described hereinabove, the output signal of the enabled phototransistor is sampled at 8 time intervals during the passage of the bill dispensed between the enabled phototransistor 252 and its associated LED.

The sampled signals are digital equivalents of the analog signal generated by the programmable gain amplifier 266 and available at the outputs of analog to digital converter 270. These 8 samples are utilized in the following manner:

As shown in Table I, ten registers are provided for storing information regarding the average values for each bill examined and these registers are designated Registers 1 through 8, the Last Valid Average Register and the Present Average Register. The manner in which the sampled data is arranged and evaluated is as follows:

After adjustment of the gain of adjustable gain amplifier 266, the first density sample of the first bill is taken. This sample value inserted into registers 1 through 8 and in the Last Valid Average Register, which registers are identified in Table I. The register group further includes a Present Average Register, which 10 registers are utilized together under control of CPU 150, to provide an adaptive density system.

The adaptive technique operates in the following manner:

The first sample is taken and is loaded into registers 1 through 8 at step 1 as shown in Table I. A pointer register which keeps a count of the sample presently being taken is utilized for purposes of transferring the contents of each successive register identified by the pointer to the Last Valid Average Register. Noting Table I at step 2, register 1 is cleared and its contents are transferred into the Last Valid Average Register. The pointer register is incremented by +1.

At step 3 the second sample is taken and is loaded into each of the registers 1 through 8, the number "1" in Table I representing one sample being stored in the register and the number "2" representing the sum of two samples being stored in a register.

At step 4, the pointer register controls the clearing of register number 2. The contents of register number 2 are transferred to the Last Valid Average Register, replacing the previous contents of this register. The pointer register is then incremented by +1.

At step number 5 the third sample is taken and is loaded into registers 1 through 8. Thereafter, register number 3 is cleared and its contents are placed in the Last Valid Average Register. This technique is repeated for each of the remaining five samples, line 16 of Table I representing the final contents of the ten registers.

Table II shows the steps performed during examination of the second bill. Referring to Table II, each number identified by a subscript "1" indicates a sample taken during the density examination of the first bill and each number accompanied by a subscript "2" identifies a sample taken during the density examination of the second bill.

At step 1, the first sample of the second bill is taken and stored in the Present Average Register as shown by line 1 of Table II. No changes are made to the contents of registers numbers 1 through 8. The remaining samples 2 through 8 of the second bill are taken and are summed in the Present Average Register as shown by steps 2 through 8. Again, no changes are made to the contents of registers 1 through 8. Upon completion of step 8, the contents of the Last Valid Average Register and the Present Average Register are compared. It is not necessary to divide the sum of the 8 samples taken for the first bill and the sum of the 8 samples taken for the second bill by 8 since the result of the comparison of the two sums will be the same so that the division operation can be avoided to simplify the program.

In the event that the deviation of the density of the second bill is, for example, greater than +45% of the nominal density (i.e. greater than 209) this indicates that the first bill was a double. In the event that the deviation in the density of the second bill relevant to the first bill is, for example, less than −45°% (i.e. 79), this indicates that the second bill is a double. So long as the deviation lies, for example, within the + and −45% range, both bills are considered as being acceptable. If either the first or second bill is determined to be a double in accordance with the above technique, the dispensing operation is halted and an alarm condition is provided whereby the display provides the legend "DBLE" and the dispensing operaton is halted. An audible alarm may also be provided.

In the event that the comparison operation indicates that the first two bills are within the above-mentioned limits, the sum of the 8 samples of the second bill are divided by 8 and inserted into each of the registers 1 through 8 as shown at step 9 of Table II.

At step 10, the contents of register number 1 are transfered into the Last Valid Average Register, register 1 is cleared and the present average register is cleared. It can be seen that until samples of 8 bills have been examined and incorporated into the density average, the density average during the first 8 bills is heavily weighted by the samples of the first bill. After samples of eight bills have been taken, the average is then updated and consists of the average of the last eight bills sampled, with each of the eight bills having an equal affect upon the average. This technique is utilized for each of the individual dispensing devices.

Lines 1 and 2 of Table III show the content of the 10 registers after sampling the third bill, accumulating the sum of 8 samples, comparing the sum to the last valid average and dividing the sum by 8 to obtain the average density value and adding this sum into each of the registers 1 through 8; and transferring the contents of register 2 to the last valid average register. The manner in which subsequent bills are examined and the density samples are introduced into the updated average is the same as was described hereinabove for each subsequent bill examined.

FIGS. 10 through 15(*b*) show the system flow diagrams which include the simplified subroutine for creating the continuously updated average, the subroutine utilized during the examination of the first bill for each dispensing device and the subroutine for handling each bill subsequent thereto.

FIG. 7 shows the stepper motor control circuit for controlling the stepper motors utilized for rotating the feed rollers of each individual dispensing device 12–18. The circuitry 300 of FIG. 7 is comprised of four (4) stepper motors 302, 304, 306 and 308 shown in simplified schematic fashion, said stepper motors being utilized for dispensing devices for dispensing $20,00, $10.00, $5.00 and $1.00 dollar bills respectively.

The four windings of each stepper motor are shown as having their upper terminals connected in common to a motor selection circuit and the opposite ends of each of the associated windings of each stepper motor are connected in common through associated diodes to a winding selection circuit. Since each of the winding selection circuits are identical in both design and function and since each of the winding selection circuits are identical in both design and function, only one of each of said circuits will be described herein for purposes of brevity. The windings of each motor are actually repeated a number of times about the rotor of the stepper motor. FIG. 7 however has been simplified for purposes of brevity, since the actual stepper motor design is conventional.

Noting for example stepper motor 302, all the windings $W_1$ through $W_4$ have the upper terminals connected in common to the collector of transistor Q20. Diode D30 couples the Q20 collector to ground, preventing the collector of Q20 from going negative. The Q20 emitter is coupled to +25 volts DC through common emitter resistor RN9. The Q20 base is coupled through RN10 to the +25 volt DC source and is also coupled through resistor RN11 to the output of inverter 310. The input of inverter 310 is coupled to ground through resistor RN12 and receives input signal ES20.

Winding W1 of all of the stepper motors 302 through 308 are connected in common to the collector of transistor Q24 through diodes D35, D39, D43 and D47 respectively. The Q24 emitter is connected to ground and its base is connected through resistor RN13 to the +25 volt DC source. The Q24 base is further connected to the output of inverter 318 whose input receives the signal $\overline{S4}$. Each of the remaining windings W2 through W4 of the stepper motors are coupled to similar control circuits which include transistors Q25 through Q27.

In order to dispense a $20.00 bill, a high level ES20 signal is applied to the input of inverter 310 causing its output to go low. This low level drives transistor Q20 into conduction. Depending upon the transistor or transistors of the group of transistor Q24 through Q27 which are rendered conductive, two of the four windings W1 through W4 of stepper motor 302 are energized through a current path extending from the +25 volt DC source through resistor RN9, transistor Q20, and two of the four transistors Q24 through Q27 to ground.

The driving circuit is simplified requiring only one additional switching transistor similar for example to switching transistor Q20, for each additional stepper motor provided, if for example, $2 bills or $50.00 bills are to be dispensed.

The control signals, which orginate in CPU 150, are coupled to the stepper motor control input terminals through the output terinals "7" through "15" of I/O circuit 222 shown in FIG. 4*a*.

Each stepper motor has its output shaft and hence the associated feed roller maintained in the home position such that the leading edge of the feed roller insert 26 travels through an angle in the range from 68 to 90 degrees when moving from the home position to the position where the leading edge engages the bottom sheet in the cassette. The stepper motor is accelerated to reach the desired feed speed which is in the range from 60 to 85 inches per second, whereupon the stepper motor is maintained driven at a constant velocity through an angle of the order of 200 to 220 degrees, the feed roller will having traveled through an angle of the order of 270 to 292 degrees from the home position to the position where it releases the sheet. During the remaining portion of travel or in the range from the remaining 90 to 68 degrees of a full revolution, the stepper motor output shaft is decelerated to bring the feed roller to a halt at the home position. The home position sensor associated with the stepper motor is thereafter examined to be assured that the feed roller is in the home position. In the event that the feed roller has not been stopped in the home position, the pin 30*a* will not block light emitted by the LED from reaching its associated sensor. Noting, for example, FIG. 6, transistor Q8 will receive light from its associated LED to provide a signal to operational amplifier OP3 which is transferred to CPU 150 through I/O 226.

Each stepper motor 302 through 308 is operated by the application of stepping pulses for stepping the stepper motor. The stepper motor, in one preferred embodiment, moves its output shaft through an angle of 1.8° per step pulse for a total of 200 pulses per revolution. A cumulative count of the step pulses applied to the driven stepper motor is maintained in a register within CPU 150. As soon as the stepper motor output shaft has moved through an angle of 270°, i.e. upon the accumulation of 150 step pulses the home position sensor is continuously monitored until it completes one full revolution, i.e. until 200 step pulses have been accumulated. In the event that the home position sensor fails to indicate that the feed roller is returned to the home position, which may for example be due to a jam, the feed roller is rotated in the feed direction through an additional 45° angle (an additional 25 step pulses). The home position sensor is examined during this interval of time and, in the event that the home position sensor fails to indicate that the stepper motor output shaft has returned to the home position, the dispensing apparatus is halted and an error signal is presented on this display 106. Once a stepper motor output shaft has been properly halted at the home position, the permanent magnetic members within the stepper motor serve to retain the stepper output shaft in the home position without the need for a holding signal or the like.

A similar routine is utilized to position the output shaft of any stepper motor not in the home position prior to energization of the stepper motor for performing a dispensing operation by stepping the stepper motor output shaft through an angle of 45° and examining the home position sensor during the rotation of the stepper motor output shaft through ⅛th of a revolution. The dispensing apparatus will be shut and an error signal is generated by display 106 in the event that the stepper motor output shaft has not been returned to the home position.

The stepper motors are driven by selecting which two of the four windings are to be energized. Digital values for each step are stored in a table in memory device 152, for example. The register maintaining a cumulative count of the number of steps already performed is used as a pointer to select the value in the drive table which identifies the next pair of windings to be energized. The table is also used to drive the stepper motor through an additional 45° angle to return its output shaft to the home position.

FIG. 8 shows a detailed circuit diagram of the keyboard 104 as compared with the simplified block diagram of FIG. 2*a*. Each of the keys of the keyboard are sequentially scanned by applying sequential scan signals to lines "19" through "23" and examining lines "35" through "39" of the circuit 330. Since the keyboard operation is conventional only a brief description of the keyboard operation will be given for purposes of simplicity. The keyboard is read by enabling circuit 332 which applies scanning signals to each of the lines "19" through "23" of circuit 330. As these lines are being scanned, the scanning signal is feed back to CPU 150 through transistor Q28. When a key is operated, the scan signal is returned to CPU 150 through the closed circuit established by the depressed key. This data is transfered to the computer through circuit 330, circuit 334 and circuit 336 which is enabled at the appropriate time by gate 342 which in turn is enabled by signals applied to gates 344 and 350. In accordance with the data collected, CPU 150 selectively illuminates the LEDs 104*e-l* through 104*k-l* (note also FIG. 2*a*) to indicate the currency dispensing mode selected and to indicate if those denominations to be utilized to make the mix of currency either during the manual denomination or manual select modes.

This data is transferred to the appropriate LEDs by means of circuits 336 and 354. Circuit 354 is enabled by decoder circuit 352 which in turn is enabled by CPU 150.

FIG. 9 shows the display circuit of FIGS. 2 and 2*a* in somewhat greater detail and is comprised of a pair of circuits 360, 362 which cooperate to convert a binary code for each character into a seven segment code for creating a numeric character at each digit position of the display circuit 364. The control inputs of circuits 360 and 362 are coupled in common to the output terminals "12" through "14" of circuit 352 shown in FIG. 8. Each character is loaded into circuits 360 through 362 in sequential fashion.

TABLE I

| | | | First Bill | | | | | | | |
|---|---|---|---|---|---|---|---|---|---|---|
| | LVA | PA | Reg #1 | #2 | #3 | #4 | #5 | #6 | #7 | #8 |
| 1. | — | — | 1 | 1 | 1 | 1 | 1 | 1 | 1 | 1 |
| 2. | 1 | — | 0 | 1 | 1 | 1 | 1 | 1 | 1 | 1 |
| 3. | 1 | — | 1 | 2 | 2 | 2 | 2 | 2 | 2 | 2 |
| 4. | 2 | — | 1 | 0 | 2 | 2 | 2 | 2 | 2 | 2 |
| 5. | 2 | — | 2 | 1 | 3 | 3 | 3 | 3 | 3 | 3 |
| 6. | 3 | — | 2 | 1 | 0 | 3 | 3 | 3 | 3 | 3 |
| 7. | 3 | — | 3 | 2 | 1 | 4 | 4 | 4 | 4 | 4 |
| 8. | 4 | — | 3 | 2 | 1 | 0 | 4 | 4 | 4 | 4 |
| 9. | 4 | — | 4 | 3 | 2 | 1 | 5 | 5 | 5 | 5 |
| 10. | 5 | — | 4 | 3 | 2 | 1 | 0 | 5 | 5 | 5 |
| 11. | 5 | — | 5 | 4 | 3 | 2 | 1 | 6 | 6 | 6 |
| 12. | 6 | — | 5 | 4 | 3 | 2 | 1 | 0 | 6 | 6 |
| 13. | 6 | — | 6 | 5 | 4 | 3 | 2 | 1 | 7 | 7 |
| 14. | 7 | — | 6 | 5 | 4 | 3 | 2 | 1 | 0 | 7 |
| 15. | 7 | — | 7 | 6 | 5 | 4 | 3 | 2 | 1 | 0 |
| 16. | 8 | — | 7 | 6 | 5 | 4 | 3 | 2 | 1 | 0 |

TABLE II

| | | | Second Bill | | | | | | | |
|---|---|---|---|---|---|---|---|---|---|---|
| | LVA | PA | #1 | #2 | #3 | #4 | #5 | #6 | #7 | #8 |
| 1. | 81 | 12 | 71 | 61 | 51 | 41 | 31 | 21 | 11 | 0 |

TABLE II-continued

| | LVA | PA | Second Bill #1 | #2 | #3 | #4 | #5 | #6 | #7 | #8 |
|---|---|---|---|---|---|---|---|---|---|---|
| 2. | 81 | 22 | 71 | 61 | 51 | 41 | 31 | 21 | 11 | 0 |
| 3. | 81 | 32 | 71 | 61 | 51 | 41 | 31 | 21 | 11 | 0 |
| 4. | 81 | 42 | 71 | 61 | 51 | 41 | 31 | 21 | 11 | 0 |
| 5. | 81 | 52 | 71 | 61 | 51 | 41 | 31 | 21 | 11 | 0 |
| 6. | 81 | 62 | 71 | 61 | 51 | 41 | 31 | 21 | 11 | 0 |
| 7. | 81 | 72 | 71 | 61 | 51 | 41 | 31 | 21 | 11 | 0 |
| 8. | 81 | 82 | 71 | 61 | 51 | 41 | 31 | 21 | 11 | 0 |
| 9. | 81 | 82 | 71 + 82/8 | 61 + 82/8 | 51 + 82/8 | 41 + 82/8 | 31 + 82/8 | 21 + 82/8 | 11 + 82/8 | 82/8 |
| 10. | 71 + (82/8) | — | 10 | 61 + 82/8 | 51 + 82/8 | 41 + 82/8 | 31 + 82/8 | 21 + 82/8 | 11 + 82/8 | 82/8 |

TABLE III

| LVA | PA | THIRD BILL #1 | #2 | #3 | #4 | #5 | #6 | #7 | #8 |
|---|---|---|---|---|---|---|---|---|---|
| 61 + (82 + 83)/8 | 83 | 83/8 | 61 + (82 + 83)/8 | 51 + (82 + 83)/8 | 41 + (82 + 83)/8 | 31 + (82 + 83)/8 | 21 + (82 + 83)/8 | 11 + (82 + 83)/8 | (82 + 83)/8 |
| 61 + (82 + 83)/8 | — | 83/8 | 10 | 51 + (82 + 83)/8 | 41 + (82 + 83)/8 | 31 + (82 + 83)/8 | 21 + (82 + 83)/8 | 11 + (82 + 83)/8 | (82 + 83)/8 |

FIGS. 10 through 15b are flow diagrams showing the operation of the controller system through the various dispensing stages.

Figure 10:
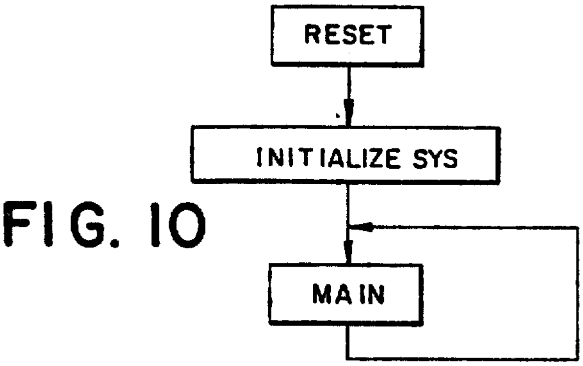

FIG. 10 shows the program in its most simplified form. Upon turn-on of the system, a RESET is generated causing the system to be initialized at which time registers are cleared, flags are cleared and the system performs certain "housekeeping" functions. Thereafter, the system enters into the main program and continues to cycle through the main program to perform dispensing operations.

Figure 11:
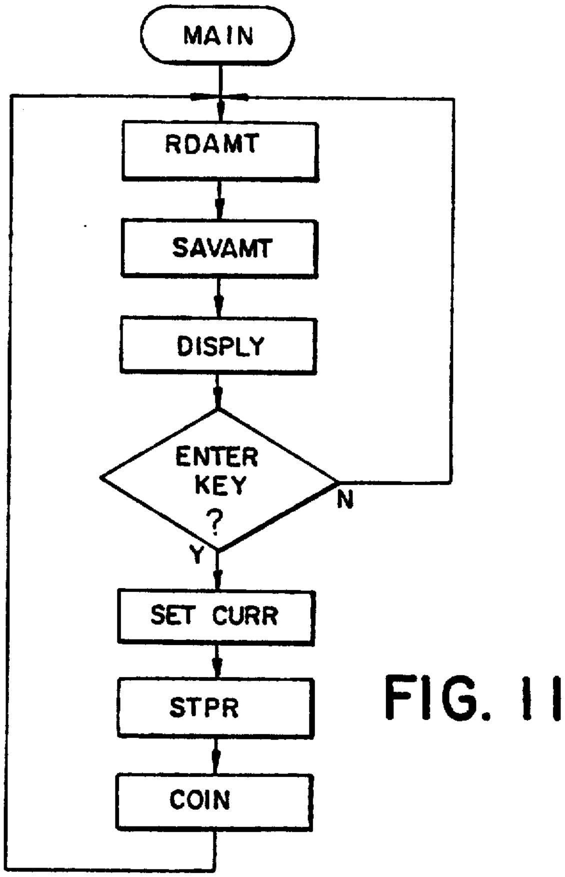

FIG. 11 shows the Main program in simplified form. Upon entry into the main program, as each key of the keyboard is operated, the amount and/or function is read. This amount is saved in an appropriate register and thereafter displayed. These entries take place until the Enter key has been operated at which time the main program advances to the Set Currency subroutine, to be described hereinbelow in greater detail. Briefly, the Set Currency subroutine reads the amount to be dispensed and determines which denominations are needed to make up the amount and the quantity of each of the denominations. These values are stored and utilized during the dispensing or Stepper subroutine to be described in detail hereinbelow. Briefly, during the Stepper subroutine the following activities are performed; the phototransistors employed in the counting and density detection operation are examined to adjust the gain to the "nominalized" value; the density values for the first bill to be dispensed are collected and the registers used in the adaptive density technique are loaded in a manner which was described hereinabove; the density values for subsequent bills are examined and, throughout the above operation, the stepper motor is stopped through one complete revolution for every bill to be dispensed. The dispensing operation for one stepper motor is given, it being understood that the dispensing operation for the stepper motor for the other denominations is substantially identical.

Thereafter, the Main program advances to the Coin Dispensing subroutine.

The Coin Dispensing subroutine, which has been omitted herein for purposes of simplicity, provides the dispensing device with the added dimensions of providing for the dispensing of coins as well as paper currency. This subroutine has been omitted for purposes of simplicity for the reason that the subroutine is outside of the scope of the present invention and is not required for understanding the present invention.

Thereafter, the main program loops back to the Read Amount subroutine for subsequent operation of the keyboard to initiate another dispensing operation.

The Read Amount, Save Amount and Display subroutines are conventional and have been omitted herein for purposes of simplicity.

Figure 12:
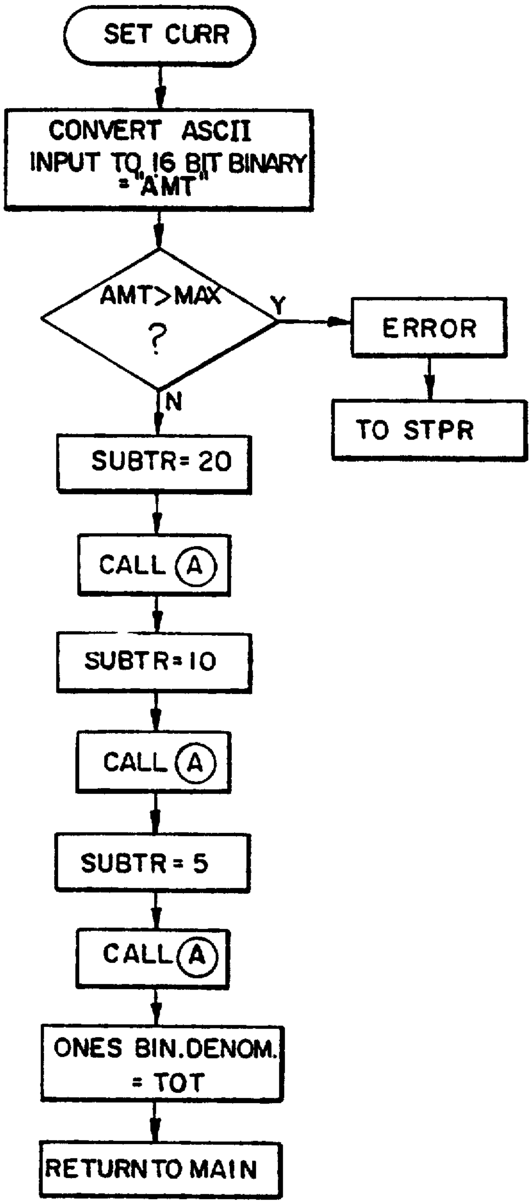

The Set Currency subroutine is shown in FIG. 12 and comprises the step of converting the ASCII format input of the amount to be dispensed into a sixteen bit binary word identified as "AMT". This amount AMT is examined to determine if it is greater than a predetermined maximum value. In the event that the amount is greater than the maximum value, all of the inputted values are zeroed and the program advances to the Stepper subroutine. The Stepper subroutine prevents any currency from being dispensed due to that fact that all of the previously stored monetary amounts have been cleared. The program then advances to the Call routine and thereafter returns to the Read Amount subroutine.

In the event that the amount AMT is less than the predetermined maximum amount, which is adjustable according to the specific application, the system enters the Set Subtraction Factor Equal 20 subroutine. This subroutine, which will be described in more detail hereinbelow, loads the binary equivalent of the decimal value "20" into the division subroutine "A"; clears all of the denomination counters and sets the pointer counter to select the "20" denomination counter, which is the counter in which the number of valid subtractions are accumulated to control the number of twenty-dollar bills dispensed.

After the subtraction factor is set, the division by multiple subtraction subroutine "A" is entered. Upon completion of this subroutine, the subtraction factor is changed to substitute the ten-dollar factor. The subroutine "A" is repeated to determine the number of ten-dollar bills that will make up the amount to be dispensed. This routine is repeated in a similar fashion for the five-dollar denomination. The one-dollar denomination merely requires that the unit dollars amount in the total register be examined to determine the number one-dollar bills to be dispensed.

After all of these values have been calculated, the stepper routine is entered to dispense paper currency with one-dollar bills being dispensed first followed by five-dollar bills, ten-dollar bills and twenty-dollar bills.

Figure 13:
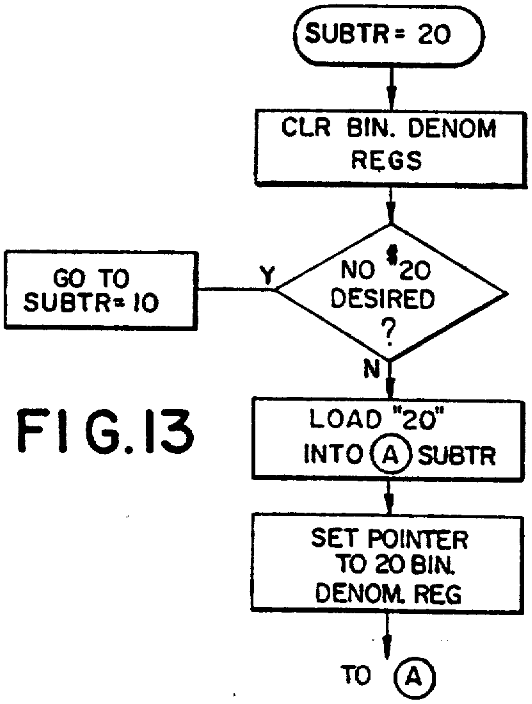

The Set Subtraction factor subroutine for setting the factor 20 into subroutine "A" is shown in FIG. 13 and includes clearing the binary denomination registers employed for storing the binary denominations to be dispensed. In the event that the operating mode in which selected ones of the denominations may be omitted from the amount to be dispensed has been activated, examination is made to determine if twenty-dollar bills are desired to dispensed. If no twenty-dollar bills are desired to be dispensed, the subroutine advances to the SUBTR equals 10 subroutine.

In the event that twenty-dollar bills are to be dispensed, the "20" factor is inserted into the "A" subroutine in binary form. The pointer is then set to the total "20" binary denomination register so that the result of each multiple subtraction is placed in the proper binary denomination register. The control system then advances to the division subroutine "A" which is shown in FIG. 14.

Figure 14:
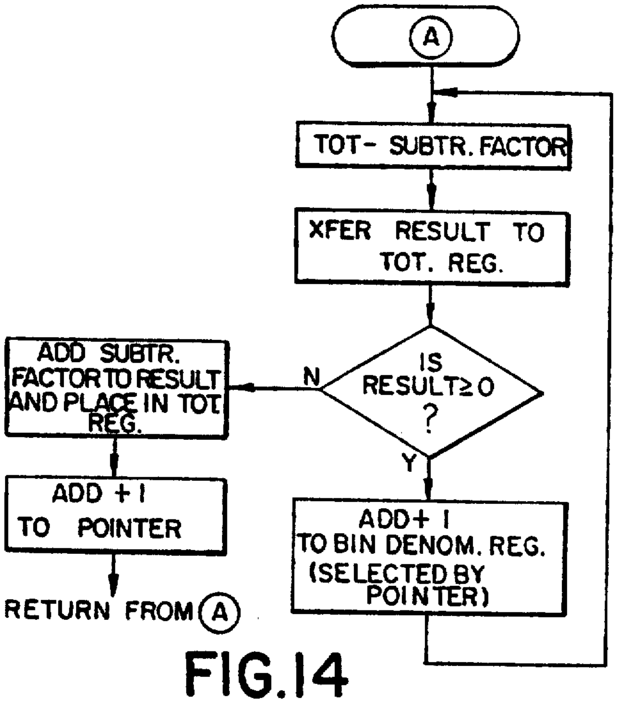

As shown in FIG. 14, the amount to be dispensed, identified as "Tot", has subtracted therefrom the subtraction factor which in this case is the binary equivalent of the decimal value "20". The result of this subtraction operation is then transferred back into the "Tot" register. If the result is greater than 0, the binary denomination register selected by the pointer is incremented by 1 and the subroutine loops back, whereupon the subtraction factor is again subtracted from the total.

This operation is repeated until the result of the substraction is less than zero, at which time the subtraction factor is added to the result and this sum is placed in the total register "Tot". Thereafter the pointer is incremented by one preparatory to the next division-by-multiple-subtraction routine.

The controller leaves the division-by-multiple-subtraction subroutine and advances to the next subroutine which sets the subtraction factor "10" into the division subroutine "A". Since the subroutine for setting the "10" and "5" factors into subroutine "A" is inserted into subroutine "A" in a manner substantially identical to that in which the factors "20" is inserted, a description of these subroutines have been omitted herein for purposes of simplicity.

Thus a determination of each denomination to be dispensed is completed and is stored in the appropriate binary denomination register at which time the stepper routine is then performed.

Figure 15:
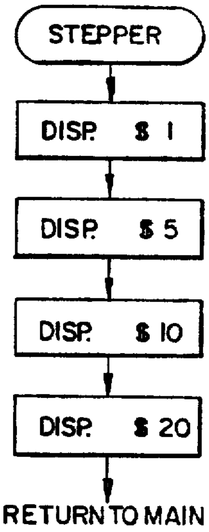

The Stepper routine is shown in simplified fashion in FIG. 15. The order of dispensing of currency by the denomination is as shown in these Figures. Since the dispensing operation for each denomination is substantially identical, a description of only one Stepper subroutine will be described herein for purposes of simplicity.

Figure 15A:
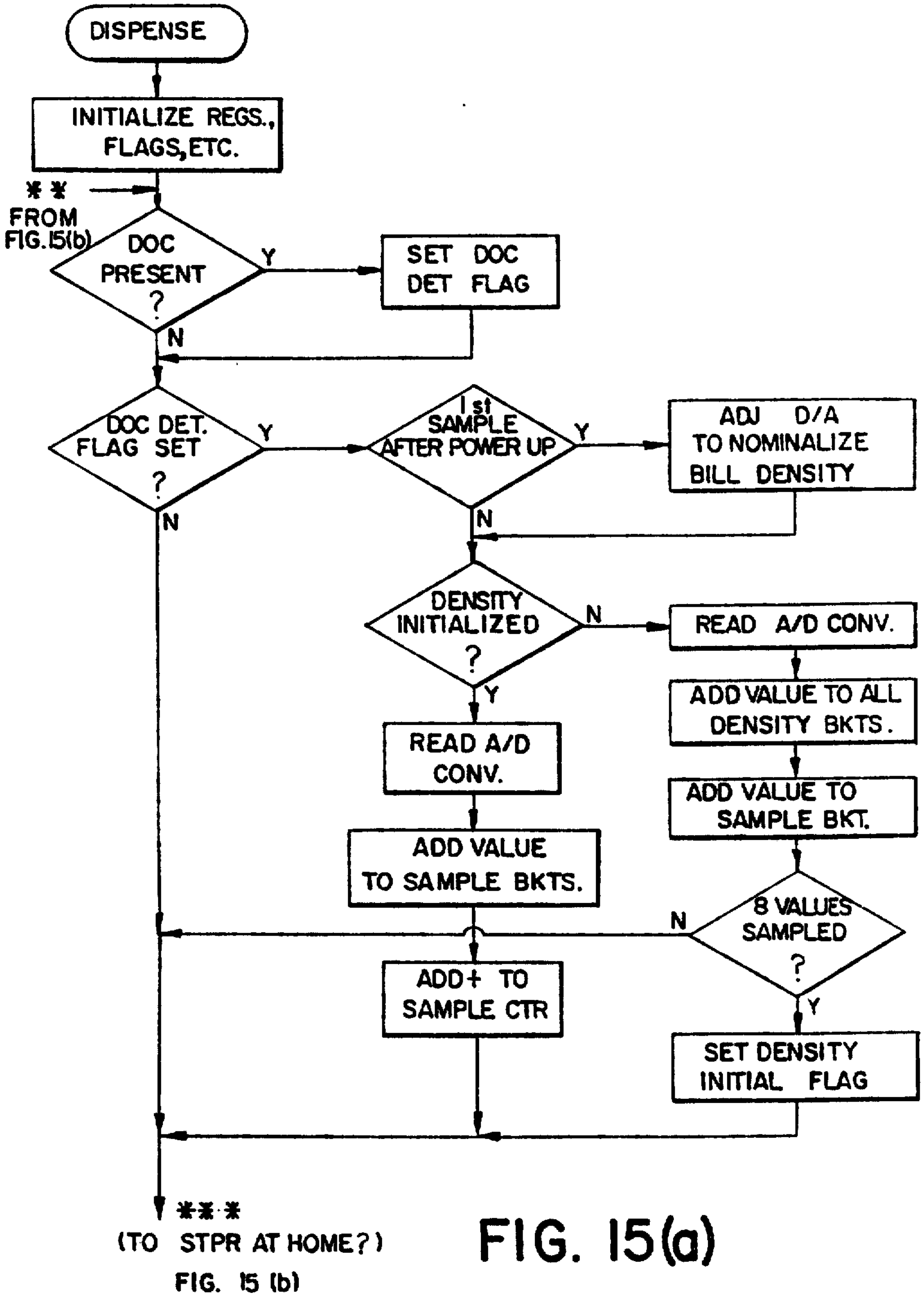
Figure 15B:
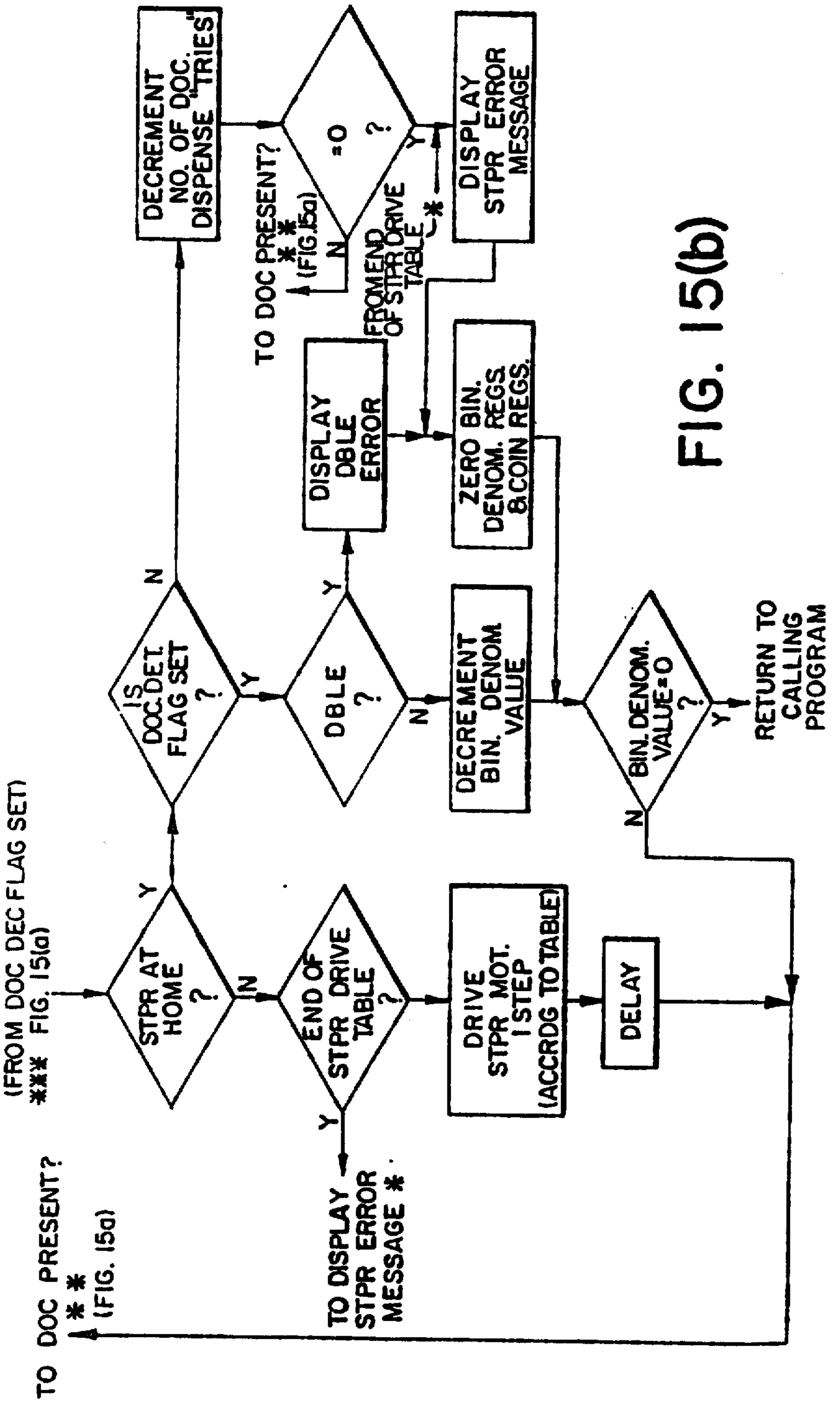

In FIGS. 15*a* and 15*b* taken together, the Dispensing subroutine shown in detail for one denomination, first initializes registers, flags and the like. The sensor associated with the individual dispensing device is examined to determine if a document is present. If a document is present, the document detection flag is set. In the event that the document detection flag is not set, the home position sensor is examined. If the stepper motor is not at home, the drive table is examined to determine if the end of the drive table has been reached. The drive table is a table stored in memory and consists of the drive controls to be applied to the stepper motor at each step thereof. A pointer register is provided and is incremented by one count each time a stepper motor step is performed to select the contents of the next table value. When the table reaches the last position, which contains the quantity "0" in binary form and the stepper is not at home, the program advances to display the Stepper Error Message. Thereafter the binary denomination registers and coin registers are zeroed and the binary denomination value is thereafter examined. At this time, since the value will be zero, the controller leaves this subroutine and returns to the Calling program, thus preventing an erroneous dispensing operation in view of the error condition.

If the end of the drive table stored in memory has not been reached, the stepper motor is advanced one step by energizing the windings selected by the value in the stepper motor drive table. A delay is initiated to provide sufficient time for the stepper motor to settle between individual steps. As was set forth hereinabove, the stepper motor steps through 1.8 degree intervals.

The program then looks at the document. If the detection flag has been set, a determination is made to see if this is the first sample after power-up of the system. In the event that this is the first sample, i.e. the first bill to be examined, the digital to analog converter is adjusted to nominalize the bill density value by adjusting the adjustable gain amplifier as was described in detail hereinabove.

In the event that the adaptive density technique has not yet been initialized, the A/D converter is read, its value is added to all density "buckets" and the same value is added to the sample bucket in accordance with the detailed description set forth hereinabove in connection with Table I.

In the event that the eight values have not yet been sampled, the home position sensor is again examined, the stepper motor advanced one step and the program eventually returns to the initialization subroutine until all eight values have been sampled.

When all eight values have been sampled, the density initialization flag is set and the controller again returns to the subroutine where the home position sensor is examined, the stepper motor is driven through one additional step and an examination is again made to determine if a document is present.

When the home position sensor is examined and indicates that the stepper motor is at home, the document detection flag is examined to see if it has been set. If the document detection flag has not been set, indicating that a document has not been detected, a "Number of Document Dispense Tries" register is decremented by one count. This register is initially set at the value "three" (3) providing for three attempts to be made to dispense a bill before the controller displays an Error condition. When the "Tries Register" hss been decremented to a zero count, the display generates a Stepper Error message and the binary denomination registers and coin registers are zeroed, as was described hereinabove.

In the event that three (3) tries have not yet been made to dispense a bill, the program returns to the "Document present?" program step, described hereinabove.

If the document detection flag has been set, an examination is made to determine if a double is present. The double detection routine, described hereinabove, examines the difference between the sum of samples for the bill presently being examined compared with the last valid average. If this difference is greater than a predetermined value, an indication will be provided that a double is present. If this condition is present, the display generates a Double Error condition and the binary registers and coin registers are zeroed as was described hereinabove.

In the event that a double is not present, the binary denomination value register associated with the dispensing bin is decremented by one count. If the binary denomination value is zero, the controller returns to the calling program. If the binary denomination value is not zero, the program returns to the "Document present?" step.

The Dispense subroutine within the Stepper routine thus advances through one of three general routines which include setting up the adaptive density registers for the first bill to be examined; accumulating samples for the second and subsequent bills being examined; and operating the stepper motor in incremental fashion.

The following is a list of the model numbers of the various solid state circuits employed in the electronic control system:

| CIRCUIT | MODEL NO. |
|---|---|
| 150 | 280A |
| 152 | 2764 |
| 154 | 6264 |
| 156 | 2816 |
| 158, 219, 220 | 74HCT138 |
| 200 | LM340T-12 |
| 202 | LM320T-12 |
| 205 | LM340T-5 |
| 206 | LM309K |
| 208 | LM309K |
| 194, 195, 198 | Bridge rectifiers |
| 184–192 | CD4050 |
| 160, 352, 334 | 74HCT541 |
| 226, 224, 222 | PIO |
| 260 | 4016 |
| 266 | DAC1006 |
| 270 | ADC0804 |
| 360, 362 | HLCD0438 |
| 364 | LCD(Liquid Crystal Display) |
| 262 | LM317T |
| Alarm | EAL060A |
| 310–316 | ULN2003 |
| 318–324 | ULN2003 |
| 332 | 74HCT74 |
| 336 | 74HCT245 |
| 354 | 74HCT373 |
| 330 | 3600 |
| 302–308 | M0620FC09 |
| 344, 340, 350 | 74HCT00 |
| 338, 346, 348 | 74LS02 |
| M | 24VDC |
| OP1, OP2, OP3 | 3302 |
| 264, OP4 | TL074 |

A latitude of modification, change and substitution is intended in the foregoing disclosure, and in some instances, some features of the invention will be employed without a corresponding use of other features. Accordingly, it is appropriate that the appended calims be construed broadly and in a manner consistent with the spirit and scope of the invention herein.

What is claimed is:

1. Apparatus for protecting the contents of a plurality of memory devices in a microprocessor system comprising a central processing unit, bus means and a plurality of memory devices communicating with said unit through said bus means, each of said memory devices having a power supply voltage input terminal and a disabling input terminal, said apparatus comprising:

a power source generating an A.C. output;

means for converting the output of said A.C. power source to a D.C. signal;

a D.C. battery source;

a common terminal for coupling D.C. power to the power supply voltage input terminal of at least one of said memory devices;

said D.C. signal being coupled to said common terminal;

said battery source being coupled to said common terminal through first switch means;

said switch means being normally open and including a control input for selectively coupling said battery to said common terminal;

first means responsive to the D.C. signal of said converting means for generating a first control signal, a first predetermined time interval after said D.C. signal has dropped to a predetermined level;

said control input being responsive to said first control signal for closing the normally open switch means;

second means responsive to said D.C. signal for generating a second control signal a second predetermined time interval after said D.C. signal has dropped to said predetermined level and means responsive to said second control signal for coupling the disabling input terminals of said memory devices to said battery source, said second predetermined time interval being greater than said first predetermined time interval whereby battery power is applied to said memory devices before said memory devices are disabled to permit said central processing unit to save operating information.

2. The apparatus of claim 1 wherein said battery source is rechargable and further comprising means for energizing the central processing unit from said D.C. signal; normally open second switch means connected between said converting means and said battery source, and means for closing said switch when the central processing unit is energized to charge said battery.

3. The apparatus of claim 1 further comprising third means responsive to said D.C. signal for generating a third control signal a third predetermined time interval after the level of said D.C. signal has dropped to said first predetermined level;

said central processing unit including means responsive to said third control signal for deactivating said central processing unit.

4. The apparatus of claim 1 wherein said second predetermined time interval is less than said third predetermined time interval and is greater than said first predetermined time interval.

5. The apparatus of claim 3 wherein upon turn on of said central processing unit the first and second and third control signals are altered at fourth and fifth and sixth time intervals after said D.C. signal increases to a second predetermined level;

said first D.C. signal responsive means shunting a common terminal coupled to the memory devices after said fifth time interval and said third D.C. signal-responsive means reactivating said central processing unit after said sixth time interval.

6. The apparatus of claim 1 wherein the second means includes semiconductor means powered by power delivered by said common terminal for coupling the disabling input terminals of said memory devices to said battery source.

7. The apparatus of claim 6 further comprising diode means for coupling said D.C. signal from said conversion means to said common terminal and being poled to prevent the output from the battery source from being fed back to said conversion means.

8. The apparatus of claim 1 further comprising:

second conversion means for converting the A.C. source output to a second D.C. signal, the second D.C. signal being coupled through a diode to said common terminal;

said common terminal being connected to the power input terminals of said memory devices.

9. Apparatus for protecting the contents of random access memory devices in a system having an on/off switch in a power down condition comprising:

an A.C. power source;

conversion means coupled to said A.C. power source for generating at least first, second and third D.C. outputs;

a rechargeable battery source;

first switch means having control means responsive to turn on of said system on/off switch for coupling the battery source to said first D.C. output;

a common terminal;

diode means for coupling the second D.C. output to said common terminal;

second switch means having control means for selectively coupling the battery source to said common terminal;

first control signal generating means coupled to said third D.C. output for generating a first control signal a predetermined time interval after the said third D.C. output drops below a pedetermined level;

said control means of said second switch means coupling said battery source to said common terminal responsive to said first control signal;

second control signal generating means for generating a second control signal a predetermined time after said third D.C. output drops to said predetermined level;

third switch means powered by power from said common terminal and having a control input responsive to said second control signal for generating a memory control output;

said memory devices having a power input coupled to said common terminal and having an enable input coupled to the common terminal through a resistor;

switch means for shunting said enable terminal to ground responsive to said memory control output.

10. A circuit for monitoring a power source to protect a system comprising a microprocessor and memory devices coupled thereto comprising:

an A.C. power source having an output;

means for converting the output of the power source to a plurality of D.C. outputs;

a rechargeable battery supply;

first switch means for coupling said A.C. power source to said converting means;

second switch means responsive to closing of said first switch means for coupling said battery supply to said one of said D.C. outputs;

said memory devices having a power input;

a common terminal coupled to said power input;

third switch means coupled between said battery source and said common terminal;

a first capacitor;

first circuit means coupling said first capacitor to one of said D.C. outputs to charge said first capacitor;

second circuit means for discharging said first capacitor;

a second capacitor;

third circuit means coupling said second capacitor to one of said D.C. outputs to charge said second capacitor at a given rate;

fourth circuit means for discharging said second capacitor at a rate which is greater than said given rate;

the arrangement being such that said first capacitor is charged and discharged faster than is the second capacitor;

said third switch means including control means responsive to discharge of said first capacitor to a predetermined level for coupling said battery supply to said common terminal;

and means responsive to discharge of said second capacitor to a predetermined level for disabling said memory devices.

11. The monitoring circuit of claim 10 wherein said memory devices include random access memory locations having contents and means responsive to said control means for saving the contents of said memory locations.

12. The monitoring circuit of claim 10 in which at least one of said memory devices has a read/write input terminal, and in which said means responsive to discharge of said second capacitor comprises means for coupling said read/write input terminal to said common terminal.

13. The monitoring circuit of claim 10 in which the memory devices have enable terminals and in which said means responsive to discharge of said second capacitor includes means for coupling a disabling signal to said enable terminals.

14. The monitoring circuit of claim 13 including means for opening said third switch when said first capacitor charges to a second predetermined level during a power up mode.

15. The monitoring circuit of claim 14 including means for removing said disable signal from said memory devices when said second capacitor charges to said second predetermined level during a power up mode.

* * * * *